United States Patent
Watanabe et al.

(10) Patent No.: US 10,616,863 B2
(45) Date of Patent: Apr. 7, 2020

(54) WIRELESS COMMUNICATION SYSTEM, DEVICE, AND CONTROL METHOD FOR SEARCHING MULTIPLE COMMUNICATION FREQUENCY CHANNELS AND PROCESSING CRYPTOGRAPHIC COMMUNICATION IN AN INFRASTRUCTURE MODE USING A RECEIVED COMMUNICATION PARAMETER INCLUDING INFORMATION OF AN ENCRYPTED KEY

(71) Applicant: CANON KABUSHIKI KAISHA, Tokyo (JP)

(72) Inventors: Mitsuhiro Watanabe, Kanagawa-ken (JP); Ken'ichi Fujii, Katsushika-ku (JP); Masanori Nakahara, Chigasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 477 days.

(21) Appl. No.: 14/837,700

(22) Filed: Aug. 27, 2015

(65) Prior Publication Data
US 2015/0365919 A1 Dec. 17, 2015

Related U.S. Application Data

(63) Continuation of application No. 13/541,190, filed on Jul. 3, 2012, now Pat. No. 9,167,371, which is a
(Continued)

(30) Foreign Application Priority Data

Apr. 23, 2003 (JP) .................................. 2003-119052

(51) Int. Cl.
*H04W 72/02* (2009.01)
*H04W 40/24* (2009.01)
(Continued)

(52) U.S. Cl.
CPC .......... *H04W 72/02* (2013.01); *G06F 3/1212* (2013.01); *G06F 3/1236* (2013.01);
(Continued)

(58) Field of Classification Search
CPC ... H04W 72/02; H04W 76/02; H04W 40/246; H04W 84/12; H04W 76/023; H04W 4/00;
(Continued)

(56) References Cited

U.S. PATENT DOCUMENTS

| 4,905,234 A | 2/1990 | Childress et al. |
| 5,261,117 A | 11/1993 | Olson |

(Continued)

FOREIGN PATENT DOCUMENTS

| CN | 1375772 A | 3/2002 |
| EP | 1 022 876 A1 | 7/2000 |

(Continued)

OTHER PUBLICATIONS

Notice of Allowance U.S. Appl. No. 14/102,779, dated Oct. 13, 2015.
(Continued)

*Primary Examiner* — Daniel C. Murray
(74) *Attorney, Agent, or Firm* — Venable LLP

(57) ABSTRACT

This invention has as its object to set a one-to-one relationship upon establishing a wireless communication channel between a wireless communication device on the information transmitting side and a wireless communication device that receives and processes the information even in an environment including a plurality of wireless communication devices, and to assure simple user's operations at least until the communication channel is established. To this end, when the user inputs a wireless communication channel establishment instruction to both a digital camera and printer having wireless communication functions, these devices
(Continued)

execute wireless communication establishment processes within an allowable time period which is specified by a time set in a timer and a retry count. When the devices can seize each other within that time period, the communication channel is established. After that, the digital camera sends a sensed image to the printer, which prints the sensed image.

16 Claims, 25 Drawing Sheets

Related U.S. Application Data continuation of application No. 12/968,131, filed on Dec. 14, 2010, now Pat. No. 8,250,218, which is a continuation of application No. 10/551,175, filed as application No. PCT/JP2004/005588 on Apr. 20, 2004, now Pat. No. 7,882,234.

(51) Int. Cl.
  *H04N 1/00* (2006.01)
  *H04L 29/08* (2006.01)
  *H04L 29/06* (2006.01)
  *G06F 3/12* (2006.01)
  *H04W 84/12* (2009.01)
  *H04W 76/10* (2018.01)
  *H04W 76/14* (2018.01)
  *H04W 28/18* (2009.01)
  *H04W 4/00* (2018.01)

(52) U.S. Cl.
  CPC ...... *G06F 3/1292* (2013.01); *H04L 29/06326* (2013.01); *H04L 29/08576* (2013.01); *H04L 67/14* (2013.01); *H04N 1/00278* (2013.01); *H04W 4/00* (2013.01); *H04W 28/18* (2013.01); *H04W 40/246* (2013.01); *H04W 76/10* (2018.02); *H04W 76/14* (2018.02); *H04W 84/12* (2013.01); *H04N 2201/0082* (2013.01); *H04N 2201/0084* (2013.01)

(58) Field of Classification Search
  CPC ..... H04W 28/18; H04W 76/14; H04W 76/10; H04L 29/06326; H04L 29/08576; H04L 67/14; H04N 1/00278; H04N 2201/0084; H04N 2201/0082; G06F 3/1212; G06F 3/1236; G06F 3/1292
  USPC .......... 709/227; 348/207.2; 455/509; 714/48
  See application file for complete search history.

(56) References Cited

U.S. PATENT DOCUMENTS

| | | | |
|---|---|---|---|
| 5,406,617 A | 4/1995 | Bauer | |
| 5,687,320 A | 11/1997 | Wiley et al. | |
| 5,699,495 A | 12/1997 | Snipp | |
| 5,768,516 A | 6/1998 | Sugishima | |
| 5,818,603 A | 10/1998 | Motoyama | |
| 5,862,404 A | 1/1999 | Onaga | |
| 5,915,096 A | 6/1999 | Rosenzweig et al. | |
| 5,937,148 A | 8/1999 | Okazawa | |
| 6,000,864 A | 12/1999 | Hanada | |
| 6,065,123 A | 5/2000 | Chou et al. | |
| 6,091,515 A | 7/2000 | Kimura | |
| 6,101,555 A | 8/2000 | Goshey et al. | |
| 6,104,886 A | 8/2000 | Suzuki et al. | |
| 6,115,137 A * | 9/2000 | Ozawa | H04N 1/00278 348/211.4 |
| 6,131,120 A | 10/2000 | Reid | |
| 6,148,198 A | 11/2000 | Anderson et al. | |
| 6,157,465 A | 12/2000 | Suda et al. | |
| 6,163,816 A | 12/2000 | Anderson et al. | |
| 6,198,542 B1 | 3/2001 | Tabata | |
| 6,249,814 B1 | 6/2001 | Shaffer et al. | |
| 6,256,322 B1 | 7/2001 | Wilson, Jr. | |
| 6,308,227 B1 | 10/2001 | Kumar et al. | |
| 6,327,613 B1 | 12/2001 | Goshey et al. | |
| 6,353,599 B1 | 3/2002 | Bi et al. | |
| 6,393,282 B1 * | 5/2002 | Iimori | H04W 36/32 455/432.1 |
| 6,445,412 B1 | 9/2002 | Shiohara | |
| 6,446,108 B1 | 9/2002 | Rosenberg et al. | |
| 6,477,570 B1 | 11/2002 | Takayama et al. | |
| 6,493,104 B1 | 12/2002 | Cromer et al. | |
| 6,522,881 B1 | 2/2003 | Feder et al. | |
| 6,529,522 B1 | 3/2003 | Ito et al. | |
| 6,552,743 B1 | 4/2003 | Rissman | |
| 6,553,431 B1 | 4/2003 | Yamamoto et al. | |
| 6,577,338 B1 | 6/2003 | Tanaka et al. | |
| 6,584,311 B1 | 6/2003 | Sorenson et al. | |
| 6,603,506 B2 | 8/2003 | Ogawa et al. | |
| 6,618,553 B1 | 9/2003 | Shiohara | |
| 6,631,008 B2 | 10/2003 | Aoki | |
| 6,633,757 B1 | 10/2003 | Hermann et al. | |
| 6,650,795 B1 | 11/2003 | Motta | |
| 6,665,712 B2 | 12/2003 | Pickup | |
| 6,693,665 B1 | 2/2004 | Shindo et al. | |
| 6,771,896 B2 | 8/2004 | Tamura et al. | |
| 6,778,827 B1 | 8/2004 | Anderson et al. | |
| 6,782,260 B2 | 8/2004 | Nakakita et al. | |
| 6,813,037 B1 | 11/2004 | Collard | |
| 6,816,067 B2 | 11/2004 | Patton | |
| 6,820,126 B2 | 11/2004 | Sibecas et al. | |
| 6,823,198 B2 | 11/2004 | Kobayashi | |
| 6,839,755 B1 | 1/2005 | Kumpf et al. | |
| 6,839,757 B1 | 1/2005 | Romano et al. | |
| 6,862,594 B1 | 3/2005 | Saulpaugh et al. | |
| 6,867,882 B1 | 3/2005 | Takahashi | |
| 6,876,382 B1 | 4/2005 | Sakamoto | |
| 6,920,506 B2 | 7/2005 | Bernard et al. | |
| 6,981,033 B2 | 12/2005 | Simpson | |
| 6,993,558 B2 | 1/2006 | Yokokura | |
| 7,009,941 B1 | 3/2006 | Uchino | |
| 7,038,714 B1 | 5/2006 | Parulski et al. | |
| 7,042,496 B2 | 5/2006 | Sato | |
| 7,062,579 B2 | 6/2006 | Tateyama et al. | |
| 7,072,053 B2 | 7/2006 | Guddanti | |
| 7,072,056 B1 | 7/2006 | Greaves et al. | |
| 7,080,154 B1 | 7/2006 | Inoue | |
| 7,088,691 B2 | 8/2006 | Fujita | |
| 7,102,640 B1 | 9/2006 | Aholainen et al. | |
| 7,103,313 B2 | 9/2006 | Heinonen et al. | |
| 7,103,357 B2 | 9/2006 | Kirani et al. | |
| 7,106,357 B2 | 9/2006 | Fukuda et al. | |
| 7,120,129 B2 | 10/2006 | Ayyagari et al. | |
| 7,146,413 B2 | 12/2006 | Spitzer et al. | |
| 7,162,507 B2 | 1/2007 | Carter | |
| 7,170,857 B2 | 1/2007 | Stephens et al. | |
| 7,174,157 B2 | 2/2007 | Gassho | |
| 7,187,461 B2 | 3/2007 | Schlonski et al. | |
| 7,190,471 B2 | 3/2007 | Sandfort et al. | |
| 7,191,236 B2 | 3/2007 | Simpson-Young et al. | |
| 7,199,895 B2 | 4/2007 | Collier et al. | |
| 7,212,513 B2 | 5/2007 | Gassho | |
| 7,215,923 B2 * | 5/2007 | Hillyard | H04W 8/005 455/41.1 |
| 7,239,416 B2 | 7/2007 | Ohmura et al. | |
| 7,256,906 B2 | 8/2007 | Nakajima | |
| 7,295,524 B1 | 11/2007 | Gray et al. | |
| 7,321,924 B2 | 1/2008 | Inoue | |
| 7,324,462 B1 | 1/2008 | Page et al. | |
| 7,324,805 B2 | 1/2008 | Nakakita et al. | |
| 7,339,912 B2 | 3/2008 | Oak | |
| 7,343,086 B2 | 3/2008 | Shiohara | |
| 7,346,268 B2 | 3/2008 | Shiohara | |
| 7,346,269 B2 | 3/2008 | Shiohara | |
| 7,363,022 B2 | 4/2008 | Whelan | |
| 7,366,103 B2 | 4/2008 | Engwer | |
| 7,372,485 B1 | 5/2008 | Bodnar et al. | |
| 7,379,660 B2 | 5/2008 | Shiohara | |

(56) References Cited

U.S. PATENT DOCUMENTS

| | | | |
|---|---|---|---|
| 7,389,448 B2 | 6/2008 | Sakai | |
| 7,411,607 B2 | 8/2008 | Kikugawa | |
| 7,418,472 B2 * | 8/2008 | Shoemaker | H04L 29/06027 709/203 |
| 7,421,466 B2 | 9/2008 | Haines | |
| 7,424,532 B1 | 9/2008 | Subbiah | |
| 7,440,459 B2 | 10/2008 | Casati | |
| 7,450,824 B2 | 11/2008 | Shiohara | |
| 7,450,825 B2 | 11/2008 | Shiohara | |
| 7,455,229 B2 | 11/2008 | Tanaka | |
| 7,463,378 B2 | 12/2008 | Williams | |
| 7,466,357 B2 | 12/2008 | Myojo | |
| 7,474,839 B2 | 1/2009 | Shiohara | |
| 7,479,984 B2 | 1/2009 | Tanaka et al. | |
| 7,502,049 B2 | 3/2009 | Aichi et al. | |
| 7,502,855 B2 | 3/2009 | Swanson et al. | |
| 7,512,081 B2 | 3/2009 | Ayyagari | |
| 7,519,697 B2 | 4/2009 | Matsukura | |
| 7,522,906 B2 | 4/2009 | Whelan | |
| 7,523,212 B2 | 4/2009 | Woolf et al. | |
| 7,533,165 B2 | 5/2009 | Makino | |
| 7,533,355 B2 | 5/2009 | Aritomi | |
| 7,535,588 B2 | 5/2009 | Wang et al. | |
| 7,545,406 B2 | 6/2009 | Itsukaichi | |
| 7,557,827 B2 | 7/2009 | Ishiyama et al. | |
| 7,561,782 B2 | 7/2009 | Shiohara | |
| 7,576,779 B2 | 8/2009 | Tanaka et al. | |
| 7,586,889 B2 | 9/2009 | Gasso | |
| 7,600,050 B2 | 10/2009 | Aritomi | |
| 7,613,426 B2 | 11/2009 | Kuehnel | |
| 7,664,081 B2 | 2/2010 | Luoma et al. | |
| 7,680,494 B2 | 3/2010 | Karaoguz | |
| 7,684,438 B2 | 3/2010 | Stephens et al. | |
| 7,719,699 B2 | 5/2010 | Tojo | |
| 7,719,706 B2 | 5/2010 | Suga et al. | |
| 7,719,707 B2 | 5/2010 | Onuma et al. | |
| 7,720,929 B2 | 5/2010 | Morohashi | |
| 7,730,219 B2 | 6/2010 | Chambers, Jr. | |
| 7,804,520 B2 | 9/2010 | Suehiro | |
| 7,826,847 B1 | 11/2010 | Roskowski | |
| 7,830,411 B2 | 11/2010 | Shiohara | |
| 7,848,263 B2 | 12/2010 | Chhabra | |
| 7,864,350 B2 | 1/2011 | Endo et al. | |
| 7,876,358 B2 | 1/2011 | Yamada et al. | |
| 7,880,910 B2 | 2/2011 | Aichi et al. | |
| 7,881,715 B2 | 2/2011 | Kirani et al. | |
| 7,882,234 B2 | 2/2011 | Watanabe | |
| 7,889,385 B2 | 2/2011 | Toda | |
| 7,936,918 B2 | 5/2011 | Silverbrook et al. | |
| 7,941,148 B2 | 5/2011 | Roskowski | |
| 7,949,223 B2 | 5/2011 | Shiohara | |
| 7,949,233 B2 | 5/2011 | Chiang et al. | |
| 7,961,345 B2 | 6/2011 | Yano et al. | |
| 7,969,467 B2 | 6/2011 | Matsutani | |
| 7,974,574 B2 | 7/2011 | Shen | |
| 7,983,523 B2 | 7/2011 | Shiohara | |
| 8,050,216 B2 * | 11/2011 | Matsuyama | H04B 1/1615 370/328 |
| 8,064,366 B2 | 11/2011 | Page | |
| 8,170,481 B2 | 5/2012 | Rangarajan | |
| 8,245,284 B2 | 8/2012 | Jiang | |
| 8,250,218 B2 | 8/2012 | Watanabe | |
| 8,290,488 B2 | 10/2012 | Chen | |
| 8,340,024 B2 | 12/2012 | Stephens et al. | |
| 8,478,300 B2 | 7/2013 | Kuehnel | |
| 8,559,350 B2 | 10/2013 | Kuehnel | |
| 8,635,335 B2 | 1/2014 | Raleigh | |
| 8,670,350 B2 | 3/2014 | Page | |
| 8,681,353 B2 | 3/2014 | Ryu | |
| 8,755,306 B1 | 6/2014 | Chhabra | |
| 9,019,876 B2 | 4/2015 | Stephens et al. | |
| 9,072,090 B2 | 6/2015 | Segev et al. | |
| 9,652,911 B2 * | 5/2017 | Fedronic | G07C 9/00103 |
| 9,898,878 B2 * | 2/2018 | Fedronic | G07C 9/00103 |
| 10,342,057 B2 * | 7/2019 | Suga | H04W 76/15 |
| 10,419,997 B2 * | 9/2019 | Amano | H04W 4/80 |
| 2001/0003191 A1 | 6/2001 | Kovacs et al. | |
| 2001/0029531 A1 | 10/2001 | Ohta | |
| 2001/0048534 A1 | 12/2001 | Tanaka et al. | |
| 2002/0026492 A1 | 2/2002 | Fujita | |
| 2002/0029277 A1 | 3/2002 | Simpson-Young et al. | |
| 2002/0030840 A1 | 3/2002 | Itaki et al. | |
| 2002/0032748 A1 * | 3/2002 | Myojo | H04W 40/246 709/217 |
| 2002/0041388 A1 | 4/2002 | Aoki | |
| 2002/0046228 A1 | 4/2002 | Scheifler et al. | |
| 2002/0048455 A1 | 4/2002 | Tamura et al. | |
| 2002/0062407 A1 | 5/2002 | Tateyama et al. | |
| 2002/0075229 A1 | 6/2002 | Ito et al. | |
| 2002/0080250 A1 | 6/2002 | Ogawa et al. | |
| 2002/0093682 A1 | 7/2002 | Nakajima | |
| 2002/0097423 A1 | 7/2002 | Qiao | |
| 2002/0105678 A1 | 8/2002 | Shiraiwa | |
| 2002/0120750 A1 | 8/2002 | Nidd | |
| 2002/0138671 A1 | 9/2002 | Struble | |
| 2002/0147819 A1 | 10/2002 | Miyakoshi et al. | |
| 2002/0150092 A1 | 10/2002 | Bontempi | |
| 2002/0161740 A1 | 10/2002 | Nakamura et al. | |
| 2002/0176366 A1 | 11/2002 | Ayyagari | |
| 2002/0180879 A1 | 12/2002 | Shiohara | |
| 2002/0194417 A1 | 12/2002 | Suzuki et al. | |
| 2003/0002073 A1 | 1/2003 | Berkema et al. | |
| 2003/0003933 A1 | 1/2003 | Deshpande et al. | |
| 2003/0007641 A1 | 1/2003 | Kinoshita | |
| 2003/0014446 A1 | 1/2003 | Simpson et al. | |
| 2003/0016378 A1 | 1/2003 | Ozawa et al. | |
| 2003/0027526 A1 * | 2/2003 | Hillyard | H04W 8/005 455/41.1 |
| 2003/0041102 A1 | 2/2003 | Simpson et al. | |
| 2003/0050963 A1 | 3/2003 | Lamming et al. | |
| 2003/0053437 A1 | 3/2003 | Bahl | |
| 2003/0056133 A1 | 3/2003 | Talley | |
| 2003/0078965 A1 | 4/2003 | Cocotis et al. | |
| 2003/0081237 A1 | 5/2003 | Ogiwara et al. | |
| 2003/0081251 A1 | 5/2003 | Tanaka et al. | |
| 2003/0091015 A1 | 5/2003 | Gassho | |
| 2003/0095524 A1 | 5/2003 | Stephens et al. | |
| 2003/0123840 A1 * | 7/2003 | Fujinami | H04N 5/765 386/234 |
| 2003/0142016 A1 | 7/2003 | Pickup | |
| 2003/0156200 A1 | 8/2003 | Romano et al. | |
| 2003/0156567 A1 | 8/2003 | Oak | |
| 2003/0185613 A1 | 10/2003 | Guddanti | |
| 2003/0193895 A1 | 10/2003 | Engwer | |
| 2003/0208595 A1 | 11/2003 | Gouge et al. | |
| 2003/0231341 A1 | 12/2003 | Aichi et al. | |
| 2004/0003060 A1 | 1/2004 | Asoh et al. | |
| 2004/0008366 A1 | 1/2004 | Ferlitsch | |
| 2004/0009769 A1 | 1/2004 | Yokoyama | |
| 2004/0019671 A1 | 1/2004 | Metz | |
| 2004/0021781 A1 | 2/2004 | Iida | |
| 2004/0039811 A1 | 2/2004 | Nakamura et al. | |
| 2004/0063458 A1 * | 4/2004 | Hori | H04W 74/02 455/554.2 |
| 2004/0095469 A1 | 5/2004 | Lin | |
| 2004/0102192 A1 * | 5/2004 | Serceki | H04W 48/16 455/434 |
| 2004/0102977 A1 | 5/2004 | Metzler et al. | |
| 2004/0131188 A1 * | 7/2004 | Wang | H04W 12/04 380/270 |
| 2004/0137855 A1 | 7/2004 | Wiley et al. | |
| 2004/0145769 A1 | 7/2004 | Collier et al. | |
| 2004/0150724 A1 | 8/2004 | Nozaki et al. | |
| 2004/0167974 A1 | 8/2004 | Bunn et al. | |
| 2004/0169730 A1 | 9/2004 | Tamura et al. | |
| 2004/0187157 A1 | 9/2004 | Chong et al. | |
| 2004/0198319 A1 | 10/2004 | Whelan | |
| 2004/0203593 A1 | 10/2004 | Whelan | |
| 2004/0230671 A1 | 11/2004 | Rollins | |
| 2005/0001024 A1 | 1/2005 | Kusaka et al. | |
| 2005/0007617 A1 | 1/2005 | Tanaka et al. | |
| 2005/0044479 A1 | 2/2005 | Williams | |
| 2005/0046896 A1 | 3/2005 | Aoki | |
| 2005/0066197 A1 | 3/2005 | Hirata et al. | |

(56) References Cited

U.S. PATENT DOCUMENTS

| | | |
|---|---|---|
| 2005/0080915 A1* | 4/2005 | Shoemaker ....... H04L 29/06027 709/231 |
| 2005/0122539 A1 | 6/2005 | Sugimoto |
| 2005/0128968 A1 | 6/2005 | Yang |
| 2005/0138380 A1* | 6/2005 | Fedronic ............ G07C 9/00103 713/172 |
| 2005/0148326 A1 | 7/2005 | Nogawa |
| 2005/0174357 A1 | 8/2005 | Wang |
| 2005/0198336 A1 | 9/2005 | Eytchison et al. |
| 2005/0270556 A1 | 12/2005 | Shimamura |
| 2005/0286075 A1 | 12/2005 | Ryu |
| 2006/0025076 A1 | 2/2006 | Yu |
| 2006/0033812 A1 | 2/2006 | Yoshida et al. |
| 2006/0045042 A1 | 3/2006 | Sethi |
| 2006/0077455 A1 | 4/2006 | Watanabe |
| 2006/0080423 A1 | 4/2006 | Brewer |
| 2006/0105714 A1 | 5/2006 | Hall et al. |
| 2006/0111103 A1 | 5/2006 | Jeong et al. |
| 2006/0133414 A1 | 6/2006 | Luoma et al. |
| 2006/0164969 A1 | 7/2006 | Malik |
| 2006/0176506 A1 | 8/2006 | Lin |
| 2006/0178139 A1 | 8/2006 | Karaoguz |
| 2006/0183477 A1 | 8/2006 | Bocking et al. |
| 2006/0197976 A1 | 9/2006 | Oka |
| 2006/0200563 A1 | 9/2006 | Hirose |
| 2006/0206592 A1 | 9/2006 | Fujii et al. |
| 2006/0212610 A1 | 9/2006 | Nago et al. |
| 2006/0212611 A1* | 9/2006 | Fujii ................ G06F 13/4282 710/16 |
| 2006/0239209 A1 | 10/2006 | Ayyagari |
| 2006/0242304 A1 | 10/2006 | Hirose et al. |
| 2006/0246946 A1 | 11/2006 | Moritomo et al. |
| 2006/0246947 A1 | 11/2006 | Fujii et al. |
| 2006/0252413 A1 | 11/2006 | Ikeda |
| 2006/0268744 A1 | 11/2006 | Sakai et al. |
| 2007/0002867 A1 | 1/2007 | Shitano et al. |
| 2007/0013781 A1 | 1/2007 | Kageyama et al. |
| 2007/0030516 A1 | 2/2007 | Tsuji et al. |
| 2007/0060213 A1 | 3/2007 | Yoshida |
| 2007/0115819 A1 | 5/2007 | Stephens et al. |
| 2007/0120955 A1 | 5/2007 | Shimosato |
| 2007/0141984 A1 | 6/2007 | Kuehnel |
| 2007/0141986 A1 | 6/2007 | Kuehnel |
| 2007/0141988 A1 | 6/2007 | Kuehnel |
| 2007/0153317 A1 | 7/2007 | Klein |
| 2007/0217332 A1 | 9/2007 | Nakahara |
| 2007/0220255 A1 | 9/2007 | Igarashi |
| 2007/0223046 A1 | 9/2007 | Shiraiwa |
| 2007/0223670 A1 | 9/2007 | Ido |
| 2007/0233834 A1 | 10/2007 | Hattori et al. |
| 2007/0253390 A1 | 11/2007 | Gassho |
| 2007/0264991 A1 | 11/2007 | Jones |
| 2007/0275701 A1 | 11/2007 | Jonker |
| 2008/0051094 A1 | 2/2008 | Maki |
| 2008/0059798 A1* | 3/2008 | Fedronic ............ G07C 9/00103 713/172 |
| 2008/0068658 A1 | 3/2008 | Chen |
| 2008/0086760 A1 | 4/2008 | Jiang |
| 2008/0123558 A1 | 5/2008 | Chhabra |
| 2008/0207129 A1 | 8/2008 | Page |
| 2008/0247369 A1 | 10/2008 | Sethi |
| 2009/0025081 A1 | 1/2009 | Quigley et al. |
| 2009/0029728 A1 | 1/2009 | Shen |
| 2009/0049519 A1 | 2/2009 | Uno |
| 2009/0177801 A1 | 7/2009 | Chambers, Jr. et al. |
| 2009/0179991 A1 | 7/2009 | Mohammad |
| 2009/0239469 A1 | 9/2009 | Rangarajan |
| 2009/0241072 A1 | 9/2009 | Chaudhri et al. |
| 2009/0248849 A1 | 10/2009 | Ishimoto |
| 2009/0323108 A1 | 12/2009 | Shimma |
| 2010/0165402 A1 | 7/2010 | Karaoguz |
| 2010/0183025 A1 | 7/2010 | Stephens et al. |
| 2010/0254286 A1 | 10/2010 | Rangarajan |
| 2011/0009135 A1 | 1/2011 | Roskowski |
| 2011/0029680 A1 | 2/2011 | Goto |
| 2011/0082909 A1 | 4/2011 | Ishibashi |
| 2011/0263251 A1 | 10/2011 | Chen |
| 2011/0320588 A1 | 12/2011 | Raleigh |
| 2012/0045993 A1 | 2/2012 | Page |
| 2012/0069386 A1 | 3/2012 | St. Laurent |
| 2012/0270587 A1 | 10/2012 | Watanabe |
| 2012/0297055 A9 | 11/2012 | Raleigh |
| 2013/0028152 A1 | 1/2013 | Kim |
| 2013/0111044 A1 | 5/2013 | Cherian |
| 2013/0137374 A1 | 5/2013 | Stephens et al. |
| 2013/0183998 A1 | 7/2013 | Pylappan |
| 2013/0235813 A1 | 9/2013 | Segev |
| 2014/0133297 A1 | 5/2014 | Raleigh |
| 2017/0287243 A1* | 10/2017 | Fedronic ............ G07C 9/00103 |
| 2018/0218551 A1* | 8/2018 | Fedronic ............ G07C 9/00103 |
| 2019/0297657 A1* | 9/2019 | Suga ................... H04N 1/32765 |

FOREIGN PATENT DOCUMENTS

| | | |
|---|---|---|
| EP | 1 117 221 A2 | 7/2001 |
| EP | 1 133 208 A2 | 9/2001 |
| EP | 1 229 724 A2 | 8/2002 |
| EP | 1241838 A2 | 9/2002 |
| GB | 2 159 373 A | 11/1985 |
| GB | 2354832 A | 4/2001 |
| JP | 4150365 A | 5/1992 |
| JP | 07303105 A | 11/1995 |
| JP | 10248088 A | 9/1998 |
| JP | 10-341303 A | 12/1998 |
| JP | 11-008625 A | 1/1999 |
| JP | 11-239312 A | 8/1999 |
| JP | 2000148637 A | 5/2000 |
| JP | 2001-144767 A | 5/2001 |
| JP | 2002057672 A | 2/2002 |
| JP | 2002-94531 A | 3/2002 |
| JP | 2002-094604 A | 3/2002 |
| JP | 2002-159053 A | 5/2002 |
| JP | 2002-185462 A | 6/2002 |
| JP | 2002-234232 A | 8/2002 |
| JP | 2002-244829 A | 8/2002 |
| JP | 2002314548 A | 10/2002 |
| JP | 2002-330142 A | 11/2002 |
| JP | 2002-345027 A | 11/2002 |
| JP | 2002344458 A | 11/2002 |
| JP | 2002-373130 A | 12/2002 |
| JP | 2002351766 A | 12/2002 |
| JP | 2003018148 A | 1/2003 |
| JP | 2003050677 A | 2/2003 |
| JP | 2003-085548 A | 3/2003 |
| JP | 2003-091467 A | 3/2003 |
| JP | 2003152735 A | 5/2003 |
| JP | 2004-110844 A | 4/2004 |
| JP | 2004511188 A | 4/2004 |
| JP | 2004229237 A | 8/2004 |
| JP | 2004328289 A | 11/2004 |
| KR | 1989-0001306 B1 | 2/1992 |
| WO | 01/37497 A1 | 5/2001 |
| WO | 01/93514 A1 | 12/2001 |
| WO | 0231793 A2 | 4/2002 |
| WO | 2004/095778 A1 | 11/2004 |
| WO | 2004/098128 A1 | 11/2004 |
| WO | 2007/007758 A1 | 1/2007 |

OTHER PUBLICATIONS

U.S. Patent and Trademark Office, Office Action dated Feb. 28, 2012, in connection with U.S. Appl. No. 10/551,174 (19 pages).

U.S. Patent and Trademark Office, Notice of Allowance dated Oct. 21, 2011, in connection with U.S. Appl. No. 10/551,173 (6 pages).

Eastman Kodak Company, "Kodak EasyShare-One zoom digital camera User's guide," 2005, 126 pages.

Digital Photography Review, "Direct Print Standard (DPS)," pp. 1 and 2, Dec. 2, 2002, available at http://www.dpreview.com/news/0212/02120101dps.asp.

Camera and Imaging Products Association, "PictBridge Overview," p. 1, Nov. 21, 2003, available at http://www.cipa.jp/pictbridge/contents_e/01pictbridge1_1_e.html.

(56) References Cited

OTHER PUBLICATIONS

Camera and Imaging Products Association, "PictBridge Direct-Printing Functions and Features," pp. 1 and 2, Oct. 5, 2003, available at http://www.cipa.jp/pictbridge/contents_e/01pictbridge1_2_e.html.
Digital Cameras Review Online, "PictBridge Technology and Digital Cameras," pp. 1-7, Oct. 23, 2004, available at http://www.digital-cameras-review-online.com/pictbridge.html.
Corcoran et al., "Wireless Transfer of Images From a Digital Camera to the Internet Via A GSM Mobile Phone", IEEE Transactions on Consumer Electronics, vol. 47, No. 3, Aug. 1, 2001, pp. 542-547, New York, NY, USA.
"The Windows XP Wireless Zero Configuration Service," Microsoft Corporation, Nov. 2002 (available at http://technet.microsoft.com/en-us/library/bb878124.aspx).
Mango, "Guide to Bluetooth Mobile Phone," China Academic Journal Electronic Publishing House (2002) (in Chinese with English translation).
European Patent Office, Communication pursuant to Article 94(3) EPC, in connection with Application No. 04 728 396.5-2412, dated Jun. 8, 2012 (6 pages).
Office Action dated Apr. 28, 2015—CN Application No. 200810084770.3.
"Wireless LAN Peripherals, Enjoy Routers and AV Equipment and Robots with Broadband Wirelessly," Nikkei Zerowan, 2002, No. 3 (the 70th issue), Nikkei Home Publications, p. 22-27, Mar. 1, 2002.
Office Action issued in connection with U.S. Appl. No. 14/102,779 dated Sep. 17, 2014.

* cited by examiner

WIRELESS COMMUNICATION SYSTEM, DEVICE, AND CONTROL METHOD FOR SEARCHING MULTIPLE COMMUNICATION FREQUENCY CHANNELS AND PROCESSING CRYPTOGRAPHIC COMMUNICATION IN AN INFRASTRUCTURE MODE USING A RECEIVED COMMUNICATION PARAMETER INCLUDING INFORMATION OF AN ENCRYPTED KEY

CROSS REFERENCE TO RELATED APPLICATIONS

The present application is a continuation of U.S. patent application Ser. No. 13/541,190, filed Jul. 3, 2012, which is a continuation U.S. patent application Ser. No. 12/968,131, filed Dec. 14, 2010, which is a continuation of U.S. patent application Ser. No. 10/551,175, filed Sep. 29, 2005, now U.S. Pat. No. 7,882,234, which is a U.S. National Stage Entry of International Application No. PCT/JP2004/005588, filed Apr. 20, 2004, which claims priority to Japan Patent Application No. 2003-119052, filed Apr. 23, 2003. The entire disclosure of each prior application is incorporated herein by reference.

TECHNICAL FIELD

The present invention relates to a communication establishment technique between devices having wireless communication functions.

BACKGROUND ART

Normally, a host computer as a versatile information processing apparatus such as a personal computer or the like and a printer are connected by wire. Such wired connection adopts a USB cable, parallel cable (complying with the Centronics standards (USA)), Ethernet, and the like.

In recent years, digital cameras have prevailed increasingly, and the recording quality of printers has improved as high as silver halide photos. Hence, there are many chances of printing images sensed by such digital camera by printers.

In order to print an image sensed by a digital camera, it is a common practice to transfer that image to a personal computer, and to print it by operating an application program that runs on the personal computer.

However, a digital camera user requires a personal computer when he or she wants to print sensed images, and much time and labor are required from when the user turns on the personal computer until he or she launches an application to print an image. Hence, such processes are far from an easy print process.

In consideration of such situation, the present applicant has proposed some techniques that directly connect a printer and digital camera by wire.

However, since such wired connection requires a connection cable as a matter of course, a demand has arisen for wireless information transmission, and wireless communications have begun to be used in communications between peripheral devices (e.g., a printer and digital camera).

Hence, the current connection method of wireless communication devices between peripheral devices will be explained first.

Note that expression "establish a communication channel" in the following description means not only to set a wireless link but also to establish a logical channel (network layer or transport layer in the OSI reference model) to allow data communications between devices.

FIG. 25 is a flow chart showing the conventional method for searching for a printer to which data is to be transmitted from a digital camera when the adhoc mode of a wireless LAN is used as wireless communication means. FIG. 25 shows a flow chart executed when a new digital camera is brought into an existing wireless LAN communication system in the adhoc mode, and establishes connection to the printer.

Referring to FIG. 25, when the digital camera is connected to the printer in the adhoc mode, an ESSID (Extend Service Set Identify) is set in the digital camera (step S2501), a channel used in a wireless communication is set (step S2502), the adhoc mode as a wireless communication mode is set (step S2503), and devices on the wireless network are searched (step S2504). Then, the user selects a printer to be used in a print process from the devices on the wireless network (step S2505), thus establishing a communication channel.

However, in such prior art, since a plurality of partners of wireless communications may be found, a selection process is indispensable even when only one partner is found.

DISCLOSURE OF INVENTION

The present invention has been made in consideration of the above situation, and has as its object to provide a technique that can raise the possibility that the transmitting and receiving sides have a one-to-one relationship even in an environment in which there are a plurality of wireless communication devices, and can simplify a user's selection operation.

In order to achieve the above object, a wireless communication system according to the present invention comprises the following arrangement. That is, there is provided a wireless communication system which comprises a first wireless communication device that stores information to be transmitted, and a second wireless communication device that receives the information and applies a predetermined process to the information, wherein each of the first and second wireless communication devices comprises: determination means for determining whether or not a wireless communication channel establishment instruction is detected; and communication establishment means for, when the determination means determines that the wireless communication channel establishment instruction is detected, executing a process for establishing a wireless communication within a predetermined time period, and when a communication channel is established by the communication establishment means of the first and second wireless communication devices, the first wireless communication device transmits information to the second wireless communication device, which applies the predetermined process to the received information.

Other features and advantages of the present invention will be apparent from the following description taken in conjunction with the accompanying drawings, in which like reference characters designate the same or similar parts throughout the figures thereof.

BEST MODE FOR CARRYING OUT THE INVENTION

Respective embodiments according to the present invention will be described hereinafter with reference to the accompanying drawings.

First Embodiment

The first embodiment will explain an example that can facilitate search and selection processes of a partner communication device with which a communication channel is to be established in an environment in which network-related setups have already been done.

Figure 1:
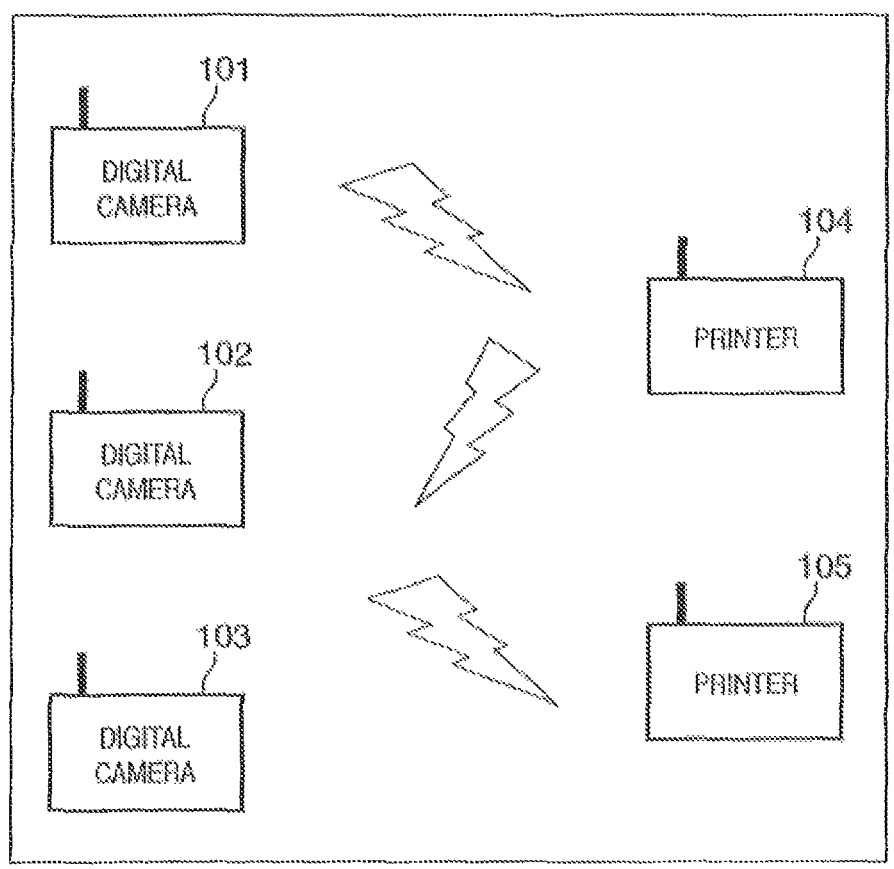
FIG. 1 is a diagram showing a network of wireless communication devices in an embodiment of the present invention.

FIG. 1 shows an example of the arrangement of a wireless communication system that allows data transmission using wireless communication means. Referring to FIG. 1, digital cameras 101 to 103 comprise a wireless communication function, and can make direct data communications using the wireless communication means among themselves or with printers 104 and 105. A communication mode of such configuration will be referred to as an adhoc mode hereinafter.

Figure 2:
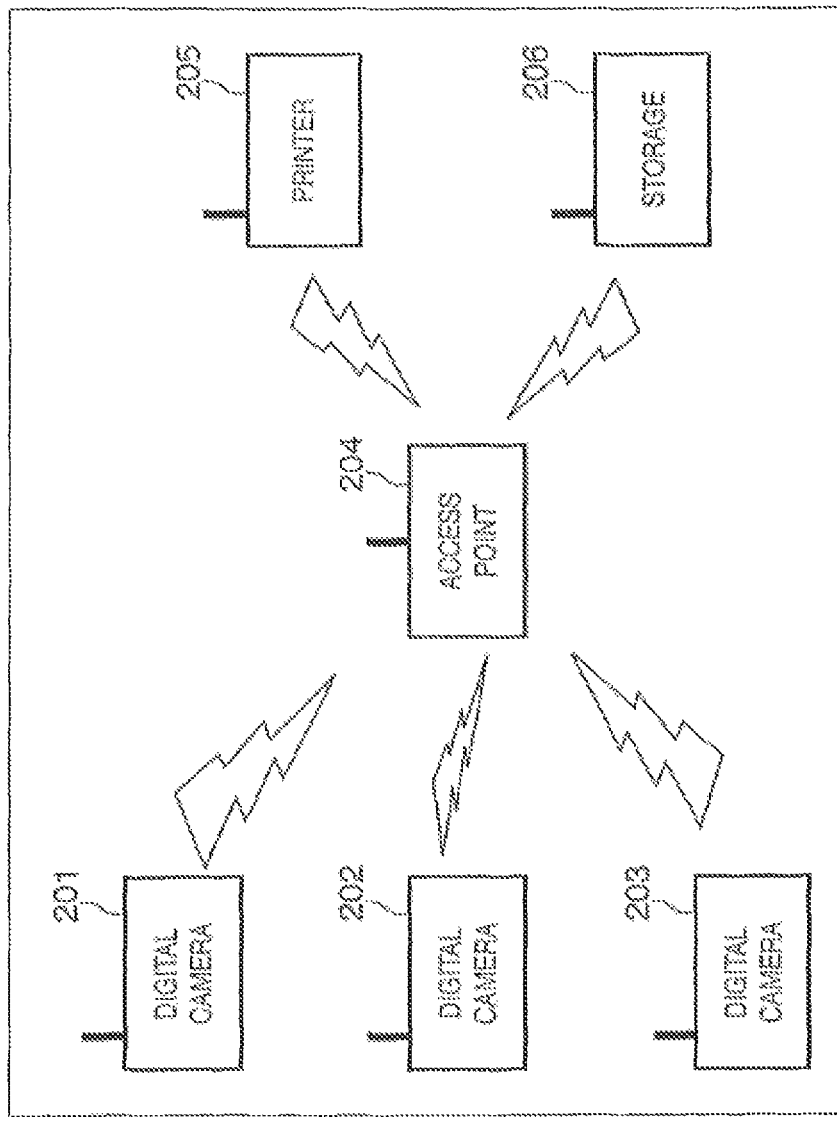
FIG. 2 is a diagram showing another network of wireless communication devices in an embodiment of the present invention.

FIG. 2 shows another example of the arrangement of a wireless communication system that allows data transmission using wireless communication means. Referring to FIG. 2, digital cameras 201 to 203 comprise a wireless communication function, and can make data communications using the wireless communication means among themselves or with a printer 205 or storage 206. This data communication is made via an access point 204. A communication mode of such configuration will be referred to as an infrastructure mode hereinafter.

The digital camera, printer, and storage in this embodiment will be explained in turn.

Figure 3:
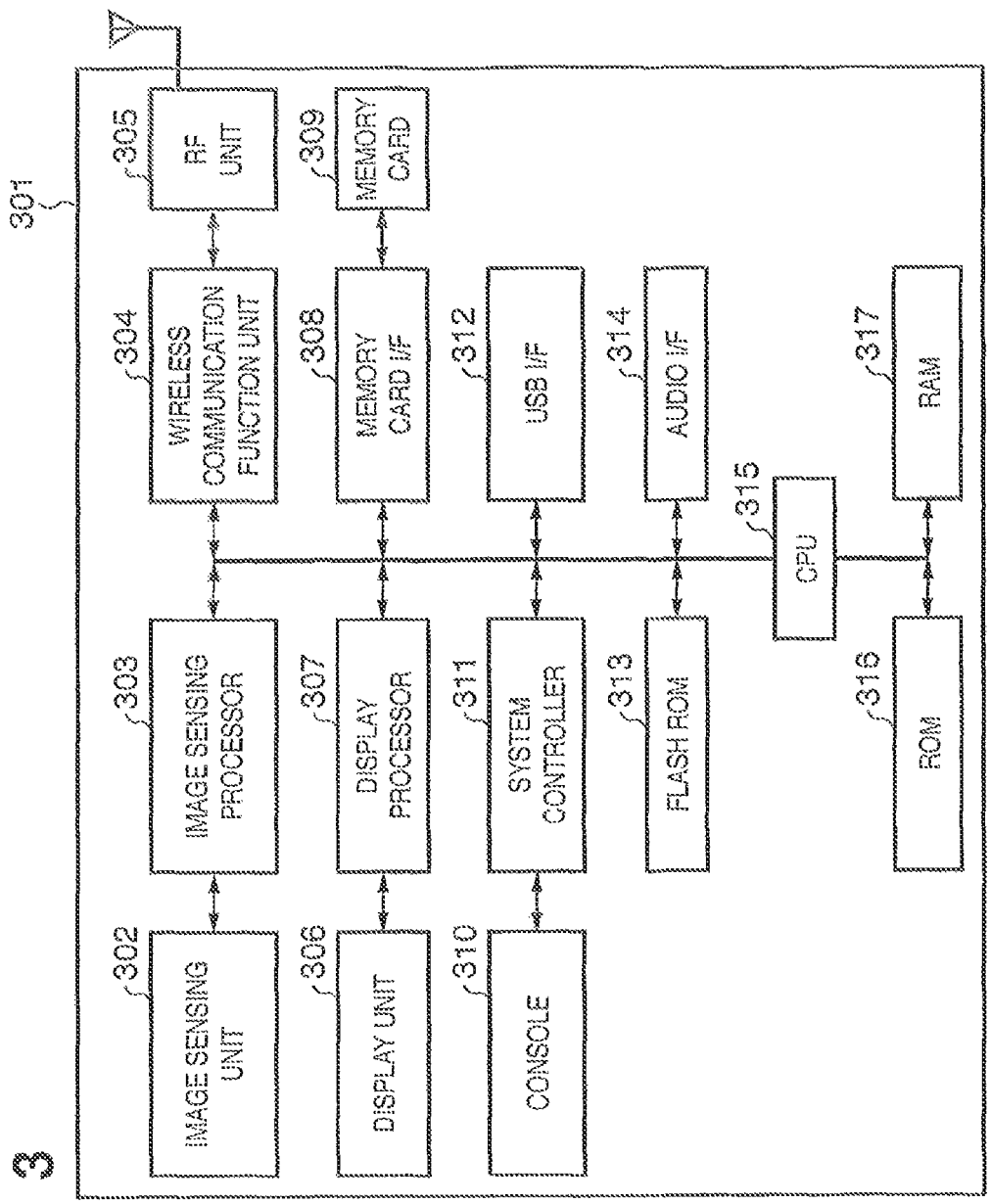
FIG. 3 is a block diagram showing the arrangement of a digital camera according to an embodiment of the present invention.

FIG. 3 is a functional block diagram showing the functional blocks of a digital camera 301, which can serve as one of the digital cameras 101 to 103 or 201 to 203 shown in FIGS. 1 and 2.

A console 310 of the digital camera is connected to a CPU 315 via a system controller 311, and comprises a shutter switch and various keys of the digital camera. An image sensing unit 302 is a block that senses an image upon depression of the shutter, and is processed by an image sensing processor 303. A display unit 306 is a block that presents information to the user by means of, for example, LCD display, LED indication, audio presentation, and the like, and its displayed contents undergo a control process by a display processor 307. An operation for selecting information from the displayed contents on the display unit 306 is made in cooperation with the console 310. That is, the display unit 306 and console 310 form a user interface.

A wireless communication function unit 304 is a block that makes wireless communications, and an RF unit 305 exchanges a wireless signal with another wireless communication device. A memory card I/F 308 is an interface used to connect a memory card 309, a USB I/F 312 is an interface used to connect an external device using USB, and an audio I/F 314 is an interface used to connect an audio signal with an external device. These functional blocks shown in this block diagram are processed under the control of the CPU 315. Programs to be controlled by the CPU are stored in a ROM 316, a flash ROM 313, or the memory card 309. Data to be processed by the CPU 315 are written in or read out from a RAM 317, the flash ROM 313, or the memory card 309 (note that the sensed image data is stored in the memory card 309).

Figure 4:
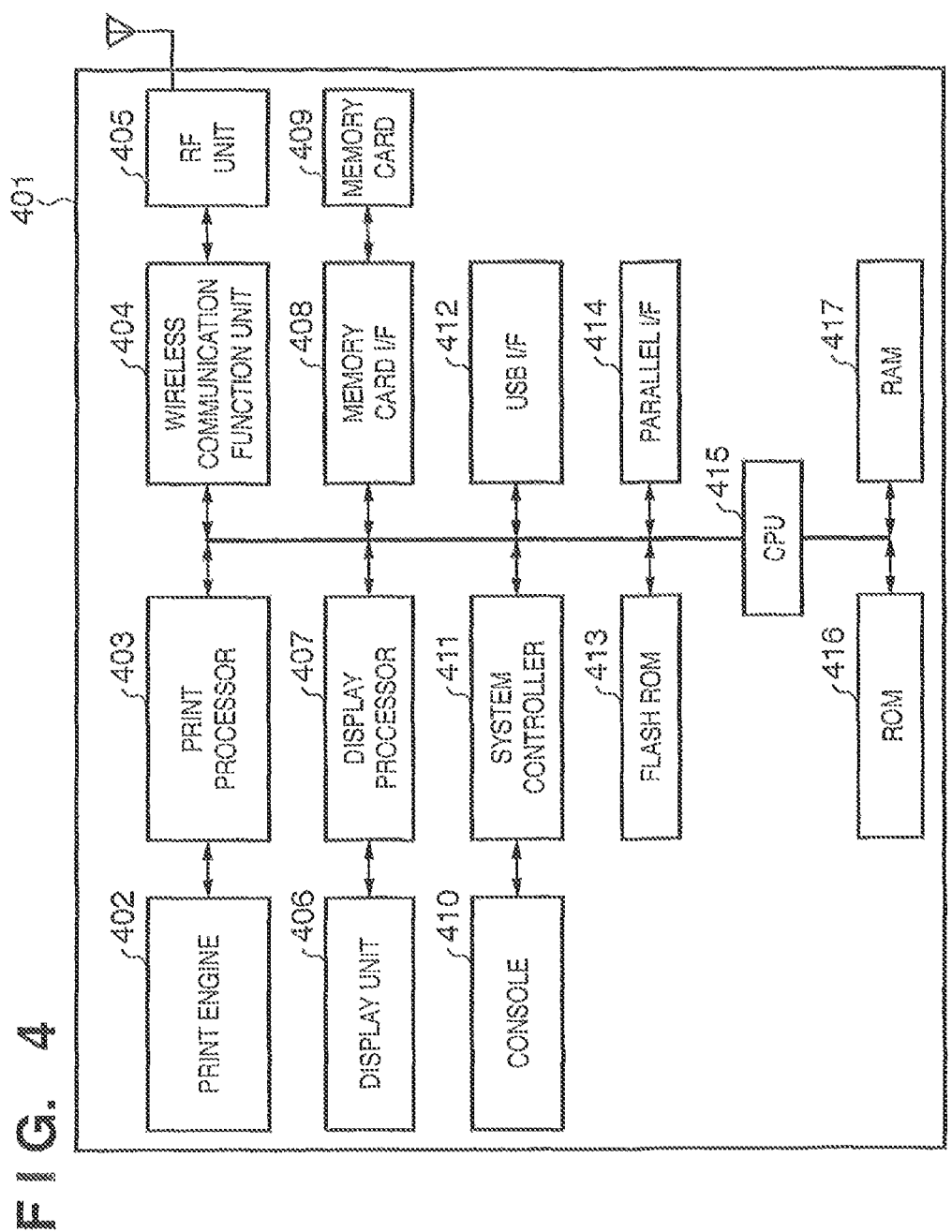
FIG. 4 is a block diagram showing the arrangement of a printer according to an embodiment of the present invention.

FIG. 4 is a functional block diagram showing functional blocks of a printer 401 in this embodiment. This printer 401 can serve as the printers 104, 105, and 205 shown in FIGS. 1 and 2.

A console 410 of the printer is connected to a CPU 415 via a system controller 411. A print engine 402 is a functional block which actually prints an image on a paper sheet, and is processed by a print processor 403. The type of print engine is not particularly limited. In this embodiment, the print engine comprises an ink-jet printer which ejects ink drops onto a print medium such as a print sheet and the like by heat energy.

A display unit 406 is a block which presents information to the user by means of LCD display, LED indication, audio presentation, and the like, and its display contents are controlled under the control of a display processor 407. That is, the display unit 406 and console 410 form a user I/F of the printer 401 in this embodiment.

A wireless communication function unit 404 is a block that makes wireless communications, and an RF unit 405 exchanges a wireless signal with another wireless communication device. A memory card I/F 408 is an interface used to connect a detachable memory card 409. When the memory card I/F 408 receives a memory card mounted in the digital camera, a sensed image can be printed.

A USB I/F 412 is an interface used to connect an external device using USB, and a parallel I/F 414 is an interface used to connect an external device (mainly a host computer) using a parallel communication. These functional blocks shown in this block diagram are processed under the control of the CPU 415. Programs to be controlled by the CPU are stored in a ROM 416, a flash ROM 413, or the memory card 409. Data to be processed by the CPU are written in or read out from a RAM 417, the flash ROM 413, or the memory card 409.

Figure 5:
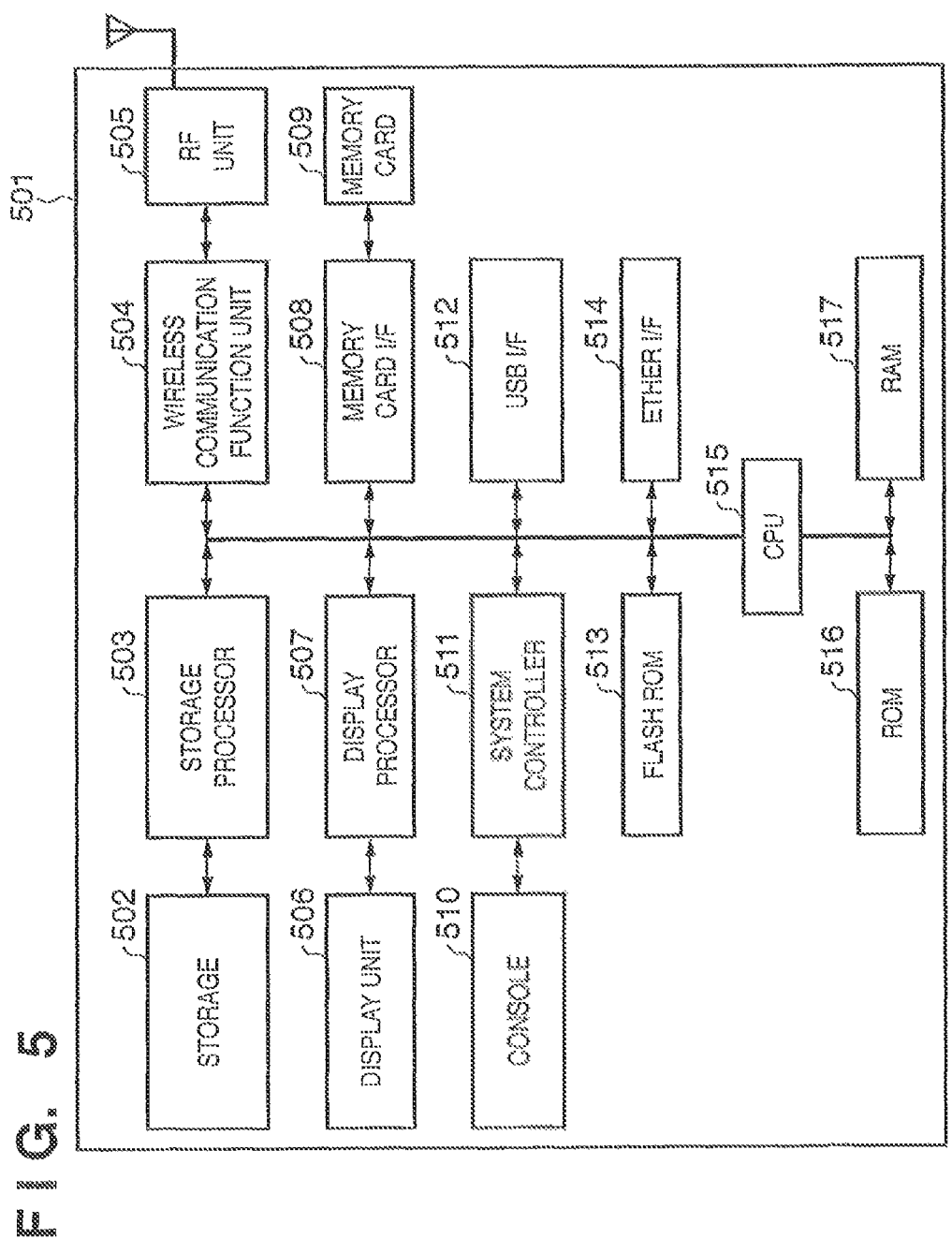
FIG. 5 is a block diagram showing the arrangement of a storage device according to an embodiment of the present invention.

FIG. 5 is a functional block diagram showing the functional blocks of a storage device 501 (to be simply referred to as a storage hereinafter) in this embodiment. This storage 501 serves as the storage 206 shown in FIG. 2.

A console 510 of the storage 501 is connected to a CPU 515 via a system controller 511. A storage 502 is a functional block that stores or reads out data, and is processed by a storage processor 503. As the storage 502, a large-capacity storage device, i.e., a hard disk drive, is preferably used. In some cases, a media write drive for CD-R or CD-RW media, rewritable DVD media, MO media, and the like as relatively large-capacity, portable storage media may be used. A display unit 506 is a block which presents information to the user by means of LCD display, LED indication, audio presentation, and the like, and is processed by a display processor 507. An operation for selecting desired one of information displayed on the display unit 506 is made via the console 510. That is, the display unit 506 and console 510 form a user I/F of the storage 501.

A wireless communication function unit 504 is a block that makes wireless communications, and an RF unit 505 exchanges a wireless signal with another wireless communication device. A memory card I/F 508 is an interface used to connect a memory card 509 (to receive a memory card of the digital camera and to directly save data in that card), a USB I/F 512 is an interface used to connect an external device using USB, and an ETHER I/F 514 is an interface used to connect an external device using an ETHER communication. These functional blocks shown in this block diagram are processed under the control of the CPU 515. Programs to be controlled by the CPU are stored in a ROM 516, a flash ROM 513, or the memory card 509. Data to be processed by the CPU are written in or read out from a RAM 517, the flash ROM 513, or the memory card 509.

The arrangements of the digital camera, printer, and storage have been respectively explained. Note that each RF unit has an antenna, which is not limited to an externally protruding one. Especially, in case of the digital camera, portability is an important factor. Hence, the antenna is preferably built in or mounted on the surface in place of the externally protruding one.

Figure 6:
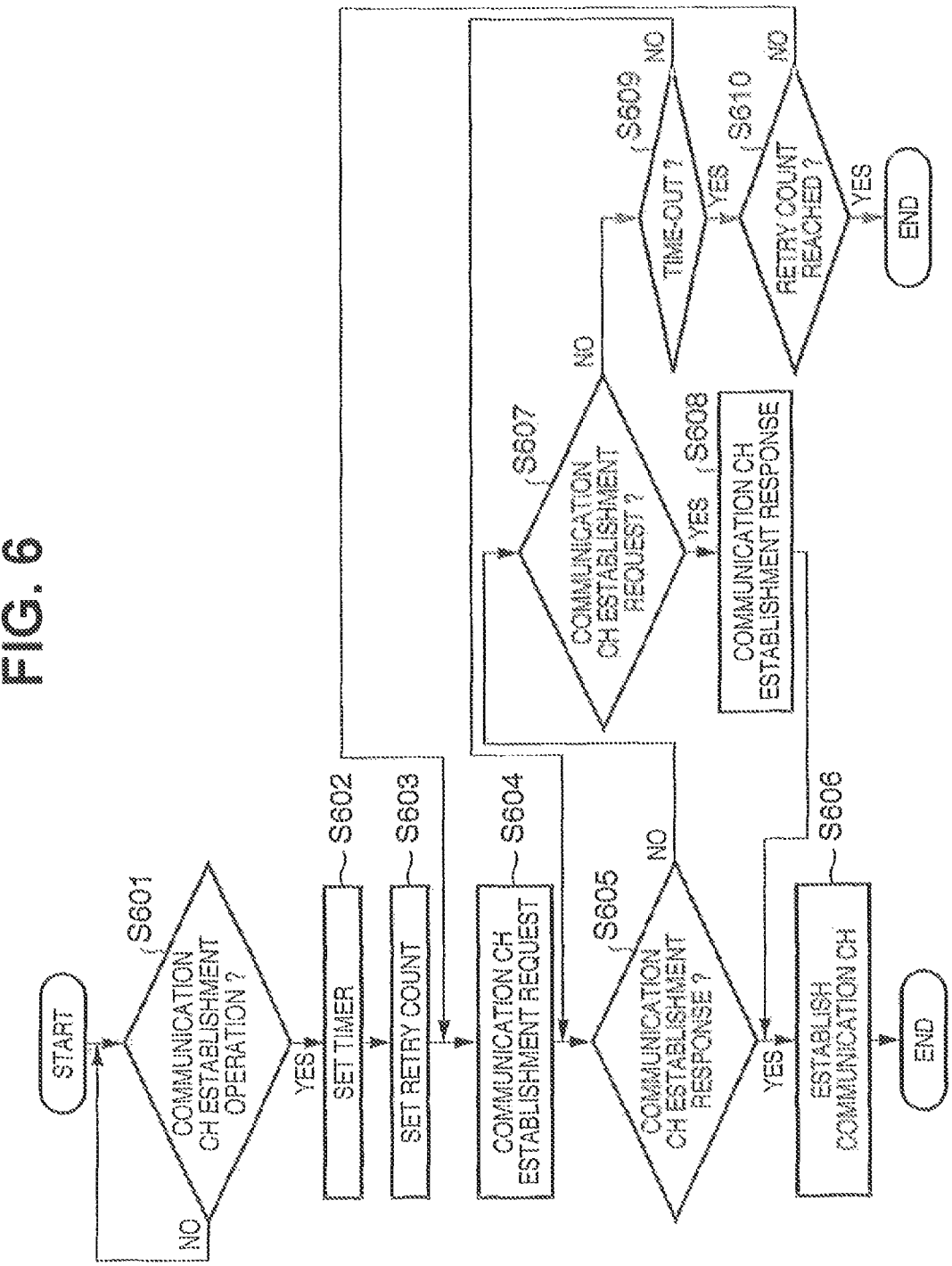
FIG. 6 is a flow chart showing a wireless communication establishment process sequence of a wireless communication device according to the first embodiment of the present invention.

FIG. 6 is a flow chart showing the processing sequence until a communication of the digital camera 301, printer 401, or storage 501 is established in this embodiment. The following explanation will be given using FIG. 6 taking the digital camera 301 as an example for the sake of simplicity. In this embodiment as well, expression "establish a communication channel" is used, and it means not only to set a wireless link but also to establish a logical channel (network layer or transport layer in the OSI reference model) to allow data communications between devices.

Upon detection of an operation of a button used to establish a communication channel via the user interface of the digital camera 301 (step S601), a timer is set (step S602), a retry count is set (step S603), and the wireless communication function unit 304 outputs a communication channel establishment request signal via the RF unit 305 (step S604).

It is checked if a communication channel establishment response is received from a partner device (step S605). If the communication channel establishment response is received, a communication channel is established with the partner communication device (step S606), thus allowing data communications. On the other hand, if a communication channel establishment request is received from a partner communication device (step S607), a communication channel establishment response is transmitted (step S608) to establish a communication channel (step S606). The control waits for reception of the communication channel establishment response or request unless a pre-set period of time elapses before neither of the communication channel establishment response are request are received (No in step S609). If either of these signals is received after the pre-set period of time has elapsed, that is, if the timer has reached a time-out (Yes in step S609), the above processes are repeated from the communication channel establishment request transmission process (step S604) until the number of retries reaches the set retry count (No in step S610). On the other hand, if the set retry count has been reached, the communication channel establishment process is aborted. That is, the control returns to a state before the instruction is input in step S601.

When the control shown in the flow chart of FIG. 6 is applied not only to the digital camera but also to the printer or storage as the receiving side, a communication channel between the digital camera and printer or storage can be established, and a print or storage process can be smoothly started.

To explain more simply, a case will be examined below wherein the user wants to print a sensed image stored and held in the digital camera by the printer via a wireless communication. In this case, the user operates wireless communication channel establishment operation buttons of the digital camera and printer within an allowable time period (about 10 sec=time-out time×retry count suffice). Since objects to be operated are only two devices on the information transmitting and receiving sides, even when there are a plurality of printers, only two devices, i.e., the designated digital camera and printer, undergo the processes shown in FIG. 6. Hence, a one-to-one communication is nearly ensured, and smooth communication establishment is made.

When the user makes button operations for wireless communication channel establishment operations on the digital camera and storage within the limited time period, a communication channel between these devices can be established, and a save process of sensed images can be easily done.

In subsequent processes, since the communication channel has been established, the user need only select an image to be printed or saved, and transmits the selected image on the digital camera side, and the printer prints the received image or the storage saves the received image, as in wired connection. Hence, a description of such processes will be omitted.

Figure 7:
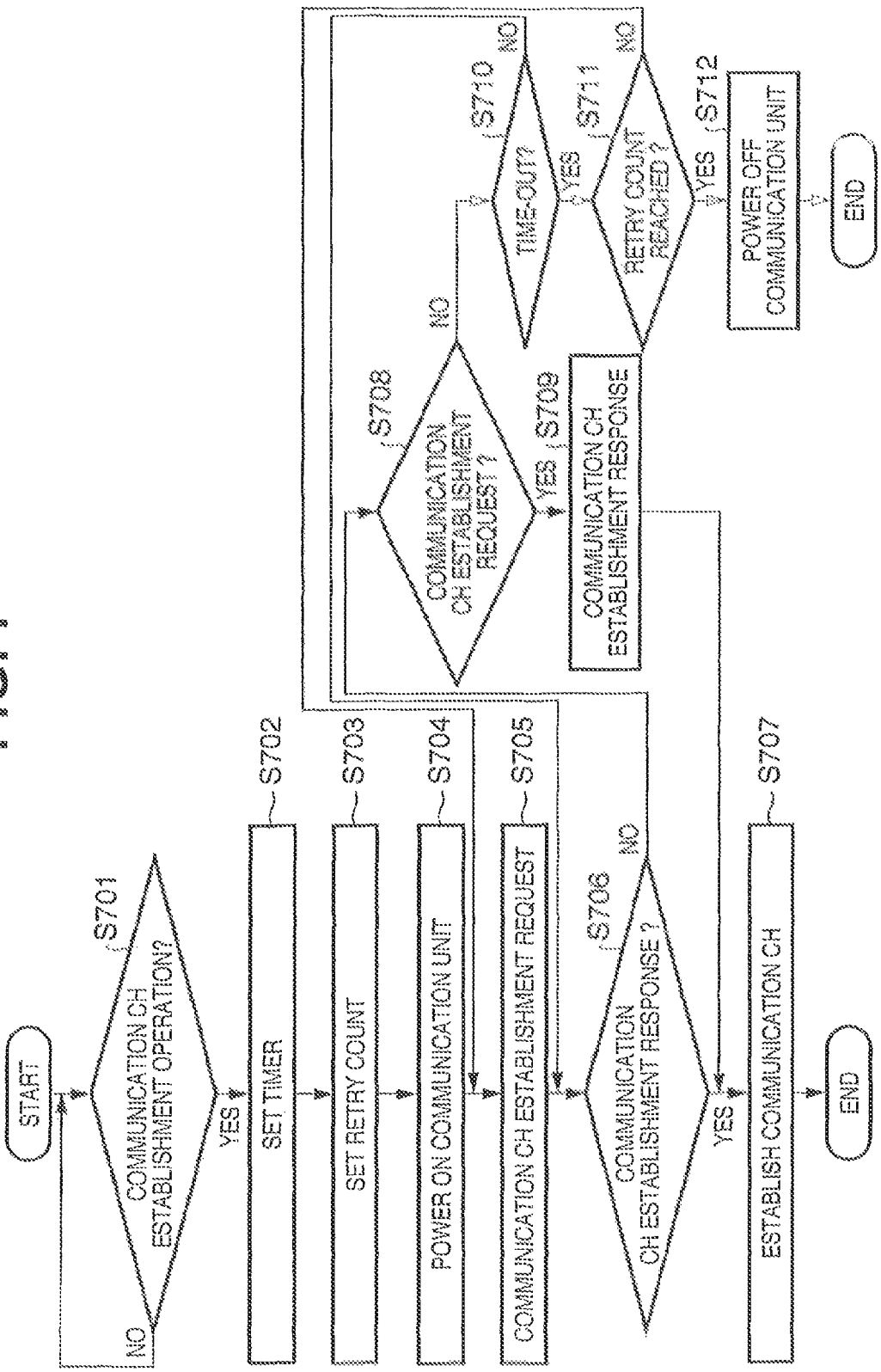
FIG. 7 is a flow chart showing another wireless communication establishment process sequence of a wireless communication device according to the first embodiment of the present invention.

FIG. 7 is a flow chart showing another control of the digital camera, printer, or storage in this embodiment.

The difference between FIGS. 7 and 6 is that a communication unit power ON process (step S704) and communication unit power OFF process (step S712) are added. By adding such communication unit power supply control processes, power savings of a wireless communication device can be attained. Especially, such control is effective for the digital camera 301 which is driven by a battery.

Figure 8:
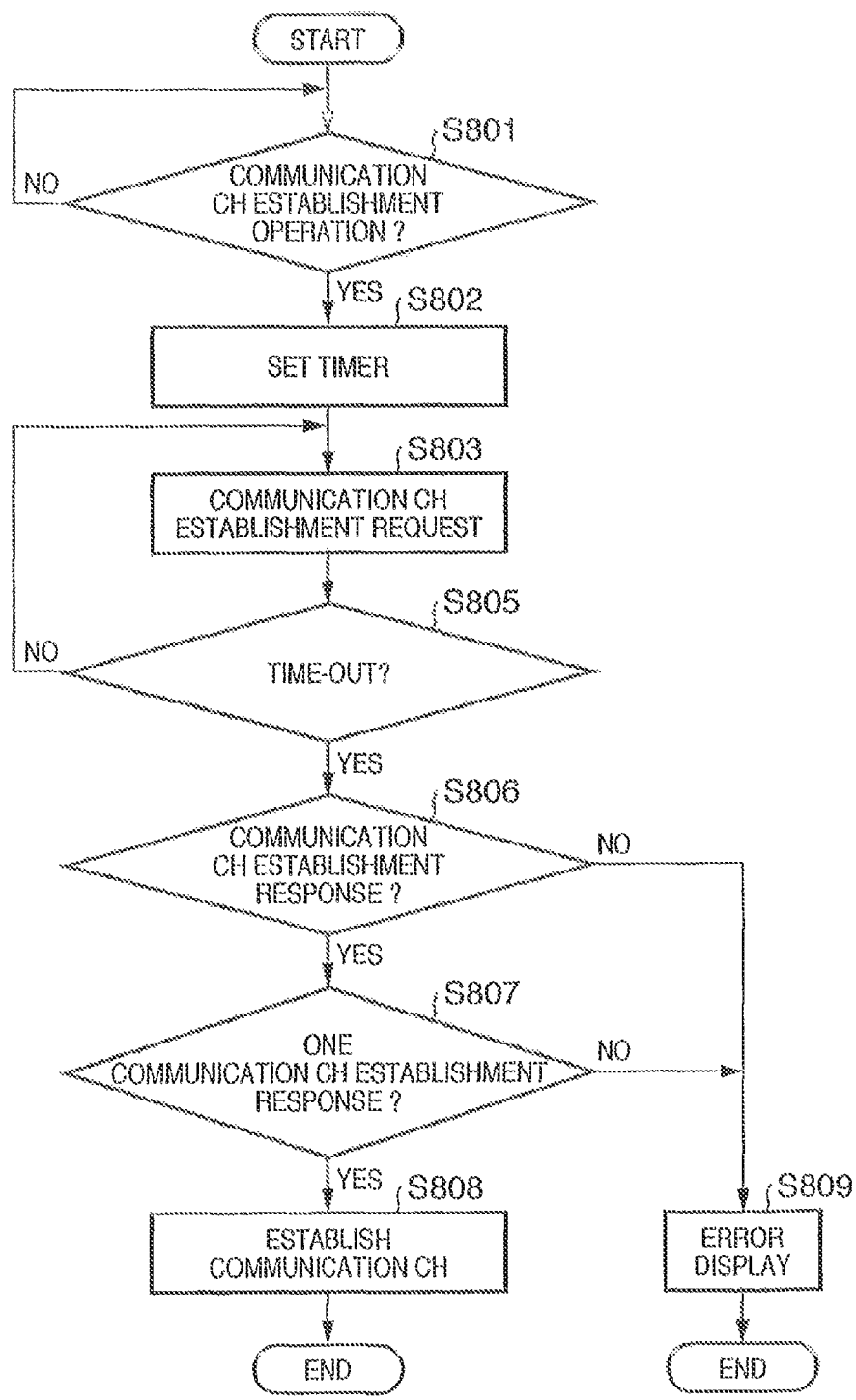
FIG. 8 is a flow chart showing still another wireless communication establishment process sequence of a wireless communication device according to the first embodiment of the present invention.

FIG. 8 is a flow chart showing still another control of the digital camera, printer, or storage in this embodiment. In this case as well, the flow chart will be explained taking the digital camera as an example for the sake of simplicity.

Referring to FIG. 8, upon detection of an operation of a button used to establish a communication channel via the user interface of the digital camera 301 (step S801), a timer is set (step S802), and a communication channel establishment request is transmitted (step S803) until the timer reaches a time-out (No in step S805). This communication channel establishment request may be transmitted once or a plurality of number of times at given intervals until the timer reaches a time-out. If the timer has reached a time-out, if no communication channel establishment response is received (step S806) or a plurality of responses are received (step S807), error display is made (step S809); if only one response is received, a communication channel is established with a partner wireless communication terminal (step S808).

If the digital camera executes the control shown in FIG. 8, and the printer side executes the control shown in FIG. 6, when no response is received from the printer or when responses are received from a plurality of printers, the digital camera side does not establish a communication channel as an error, thus prompting the user who operates the device to redo an operation. In other words, if the user inputs an instruction that allows to establish a communication channel with only one printer, he or she need not make any operation associated with selection of the printer from the digital camera.

As described above, in order to print a sensed image held in the digital camera, the user must operate instruction buttons for communication channel establishment operations on two devices, i.e., that digital camera and a target printer. Hence, if there are a plurality of printers, the digital camera receives a response from only one printer. Therefore, it is nearly unlikely that responses are received from a plurality of printers in step S807 in FIG. 8. It is determined in step S807 in FIG. 8 that responses are received from a plurality of printers when another user happens to issue a wireless print instruction to the digital camera and printer.

Figure 9:
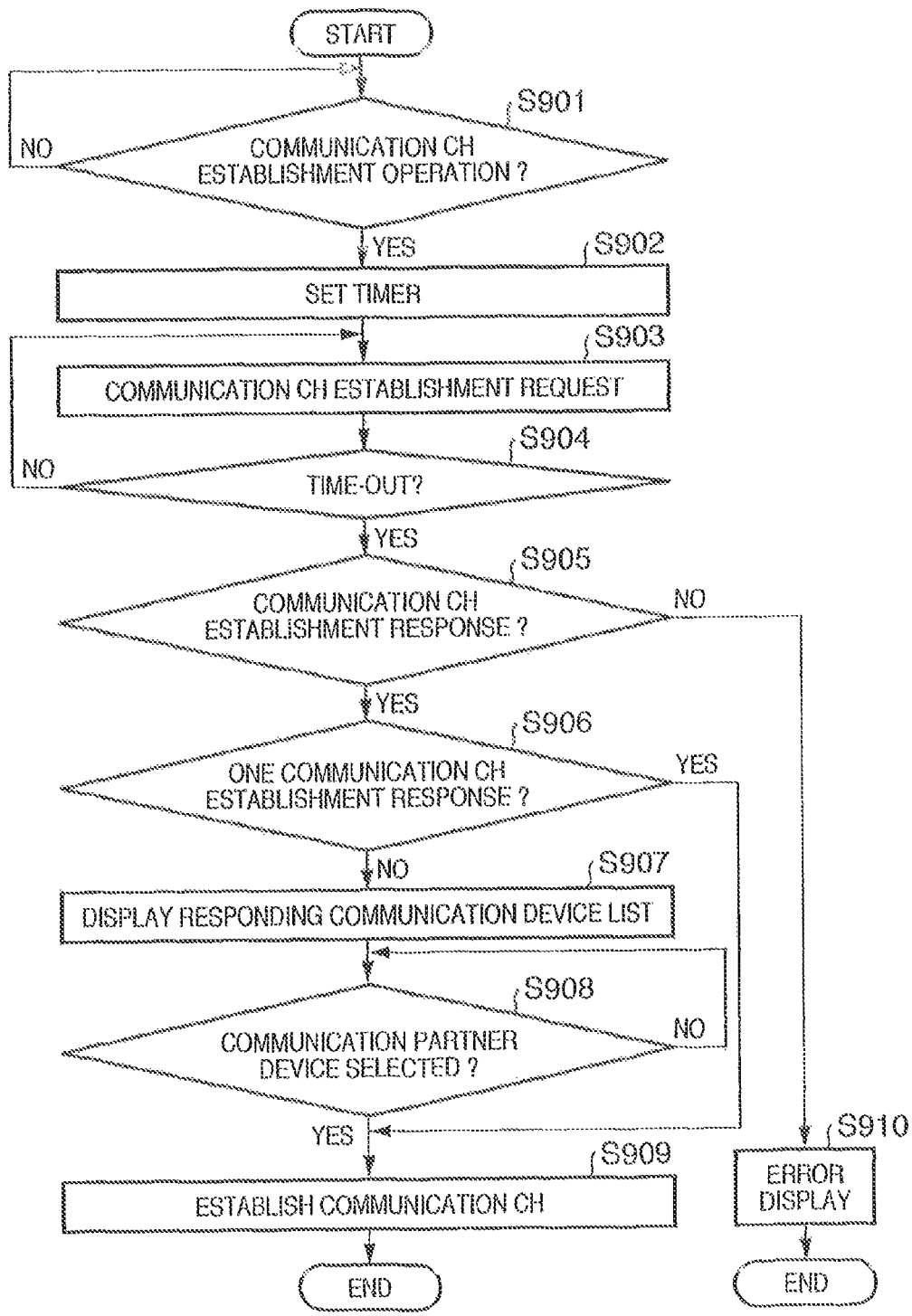
FIG. 9 is a flow chart showing yet another wireless communication establishment process sequence of a wireless communication device according to the first embodiment of the present invention.

FIG. 9 is a flow chart showing still another control of the digital camera, printer, or storage in this embodiment. In this case as well, the following description will be given taking the digital camera as an example for the sake of simplicity.

The flow chart of FIG. 9 is basically the same as that of FIG. 8, except that if communication channel establishment responses are received from a plurality of devices (step S906), a plurality of pieces of responding terminal information are displayed (step S907) to prompt the user to select one of them (step S908), thus establishing a communication channel with the selected partner device (step S909).

If the digital camera executes the control shown in FIG. 9, and the printer side executes the control shown in FIG. 6, when responses are received from a plurality of printers, these printers are displayed, and the user selects one of them. If only one response is received, a communication channel is directly established without the intervention of the user's selection operation.

Figure 10:
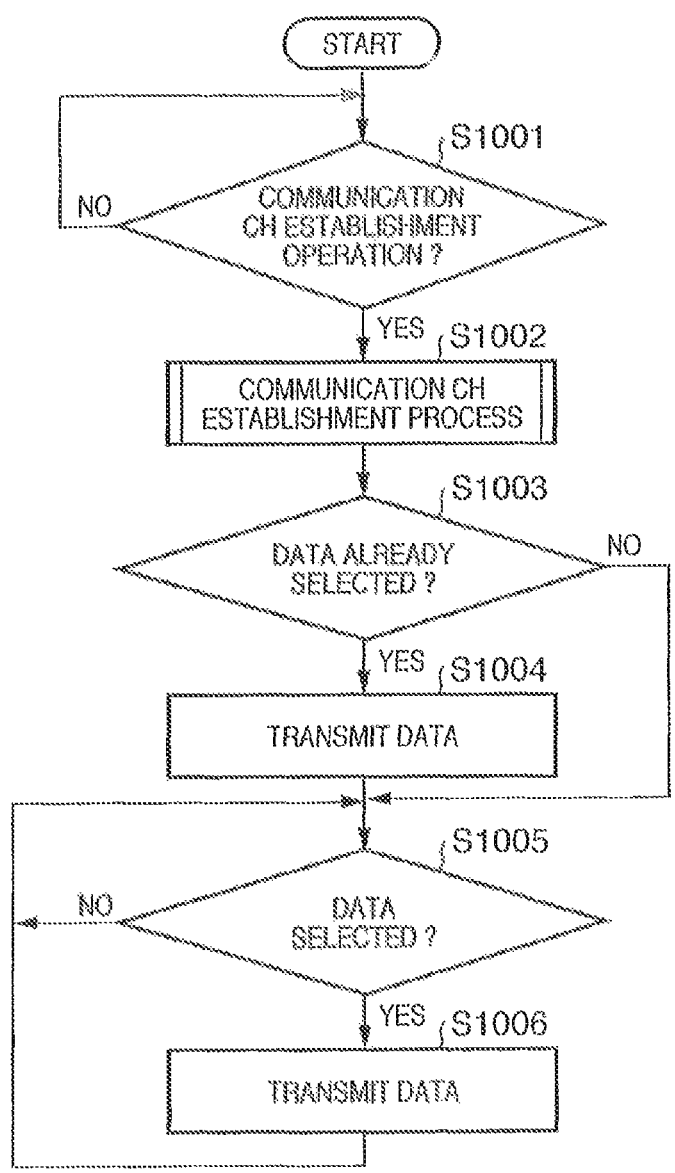
FIG. 10 is a flow chart showing a processing sequence of the digital camera according to the first embodiment of the present invention.

FIG. 10 is a flow chart showing still another control of the digital camera, printer, or storage in this embodiment. In this case as well, the flow chart will be explained taking the digital camera as an example for the sake of simplicity.

Referring to FIG. 10, upon detection of an operation of a button used to establish a communication channel via the user interface of the digital camera 301 (step S1001), a communication channel establishment process is executed according to one or a combination of the control processes shown in FIGS. 6 to 9 (S1002). If photo data to be transmitted to the printer has already been selected (step S1003) at the time of establishment of the communication channel, data is immediately transmitted to the printer to which the communication channel has been established (step S1004). After that, every time photo data to be transmitted is selected (step S1005), data is transmitted to that printer (Step S1006). The determination process in step S1003 is attained by designating an image to be printed (or a plurality of images) before a wireless communication, storing the designation result in the flash ROM 313 with a predetermined file name, and then checking if that file is stored. Alternatively, whether or not information that specifies an image to be printed is described in a predetermined format in a predetermined region of the flash memory 313 may be determined in place of the file name.

According to the above process, the operator of the digital camera 301 can start a print process by selecting an image to be printed in advance, and then inputting a communication establishment instruction to both the printer and digital camera, thus obviating the need for any wireless communication setup operations.

Figure 11:
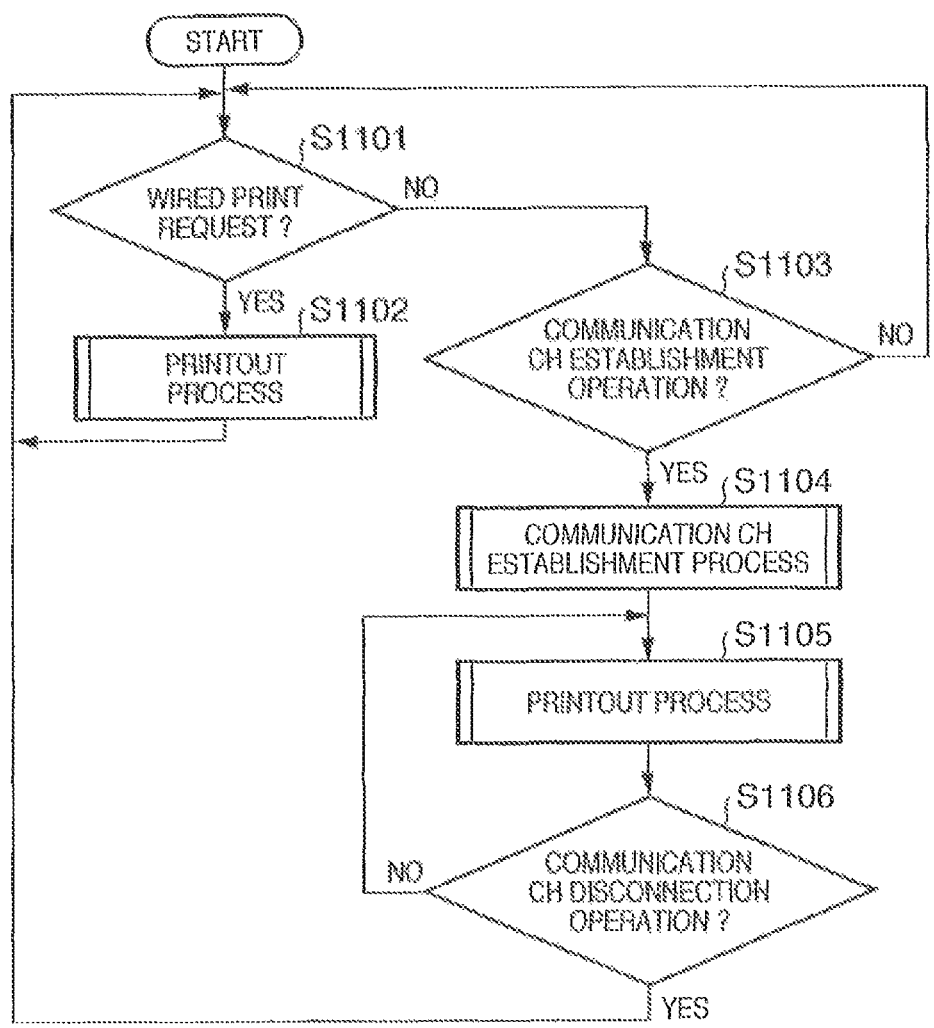
FIG. 11 is a flow chart showing a processing sequence of the printer according to the first embodiment of the present invention.

FIG. 11 is a flow chart showing another control of the printer 401 in this embodiment. Assume that the printer 401 is connected to a PC or the like by wire (e.g., the USB interface or the like), and data to be printed out is also transmitted from that wire.

Referring to FIG. 11, the CPU 415 of the printer 401 determines whether or not a print request from the wire is detected (step S1101) and whether or not an instruction button for a communication channel establishment operation is operated (step S1103). The CPU 415 waits for the print request or wireless communication establishment instruction.

If it is determined that the print request from the wire is detected (Yes in step S1101), a printout process designated by that request is executed (step S1102). If it is detected that the instruction button for a communication channel establishment operation is operated (Yes in step S1103), a communication channel establishment process is executed according to one of the control processes shown in FIGS. 6 to 9 (step S1104). Only a print process from the wireless communication channel is accepted (step S1105) before a communication channel disconnection instruction button is operated (No in step S1106), and a print request from the wire is not accepted. Note that the printer 401 has the wireless channel disconnection instruction button in the above description. However, the user may instruct a series of print operations, and disconnection of the communication with the digital camera may be used as a trigger.

If the communication establishment process has failed in step S1104, wired connection is enabled, and the flow returns to step S1101 while skipping steps S1105 and S1106.

Figure 12:
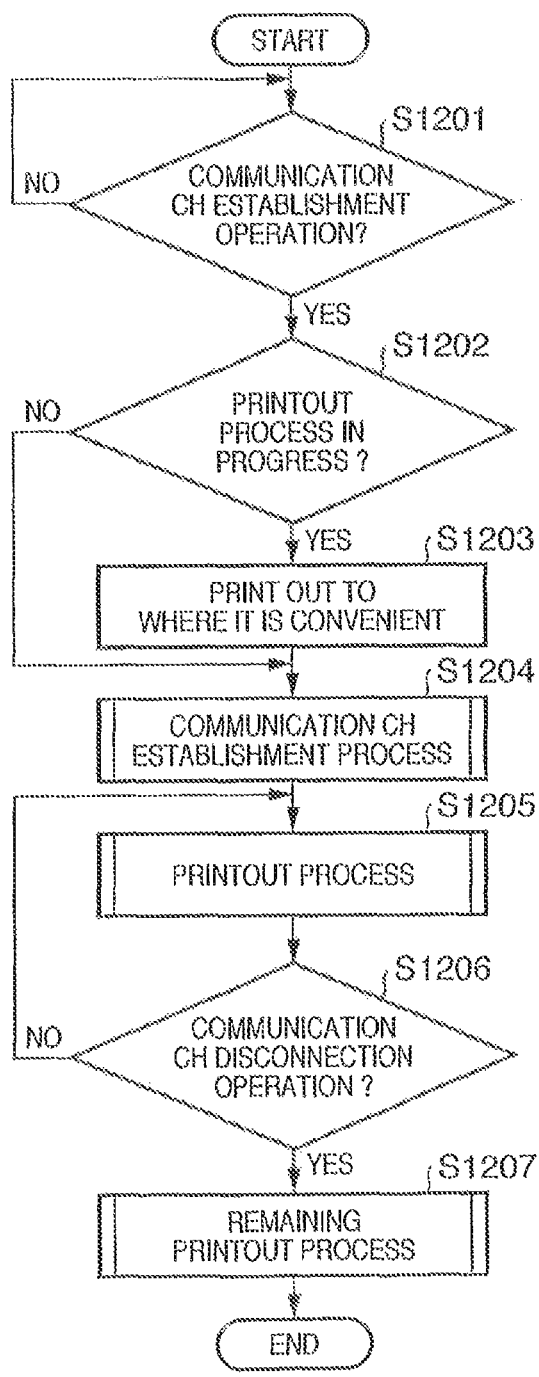
FIG. 12 is a flow chart showing another processing sequence of the printer according to the first embodiment of the present invention.

In FIG. 11, the operation of the wireless communication channel establishment operation instruction button is ignored during the wired print process. Hence, an example that solves such problem will be explained with reference to the flow chart of FIG. 12.

Upon detection of the operation of a communication channel establishment operation instruction button (step S1201), it is checked if a printout process from a device connected by wire is in progress (step S1202). If the printout process is in progress, the current print data is printed out to where it is convenient (to the end of a page in practice) (step S1203). At this time, a busy signal is output to the device connected by wire to control it to wait for transmission of the next page. Then, a communication channel establishment process is executed (step S1204). Only a print process from the wireless communication channel is accepted (step S1205) before that communication channel is disconnected (step S1206). After the communication channel is disconnected, a ready signal is output to the device connected by wire to continue the print process from the wire (if pages to be printed still remain) (step S1207).

If the printer 401 of this embodiment comprises a large-capacity storage device (hard disk or the like), the aforementioned busy signal need not be output. This is because data received via the wire need only be sequentially spooled in the above storage device.

Second Embodiment

The second embodiment will be described below. The second embodiment will explain an example that can facilitate search and selection processes of a partner communication device with which a communication channel is to be established even in different networks.

Figure 13:
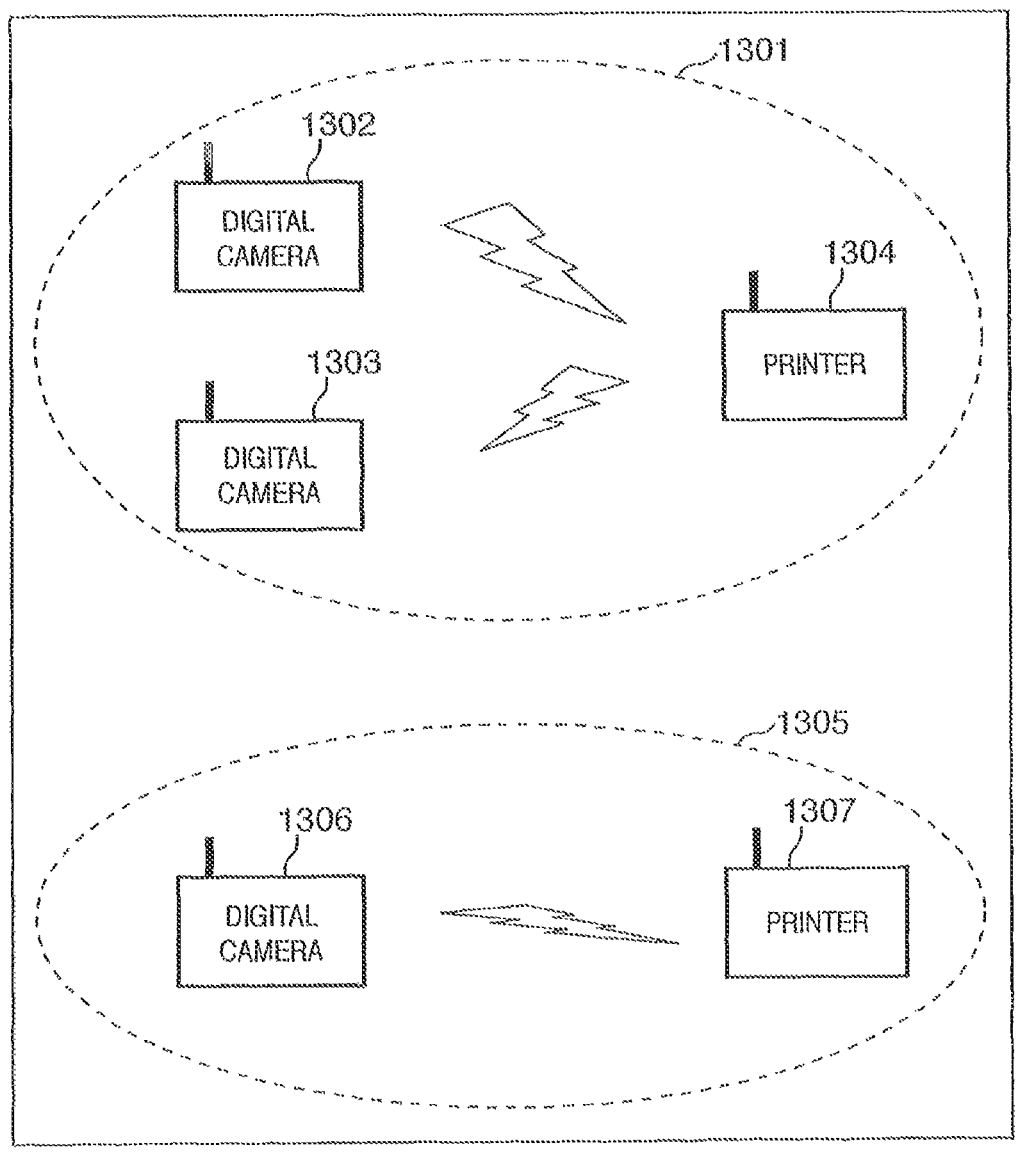
FIG. 13 is a diagram showing an example of the arrangement of a wireless communication system according to the second embodiment of the present invention.

FIG. 13 is a diagram showing an example of the arrangement of a wireless communication system that allows data communications using wireless communication means.

Referring to FIG. 13, digital cameras 1302 and 1303 (their arrangements are the same as that shown in FIG. 3) comprise wireless communication functions, and form a wireless adhoc network 1301 that makes data communications between the digital cameras or with a printer 1304 (with the same arrangement as in FIG. 4) using the wireless communication means. Also, a digital camera 1306 forms a wireless adhoc network 1305 with a printer 1307.

Figure 14:
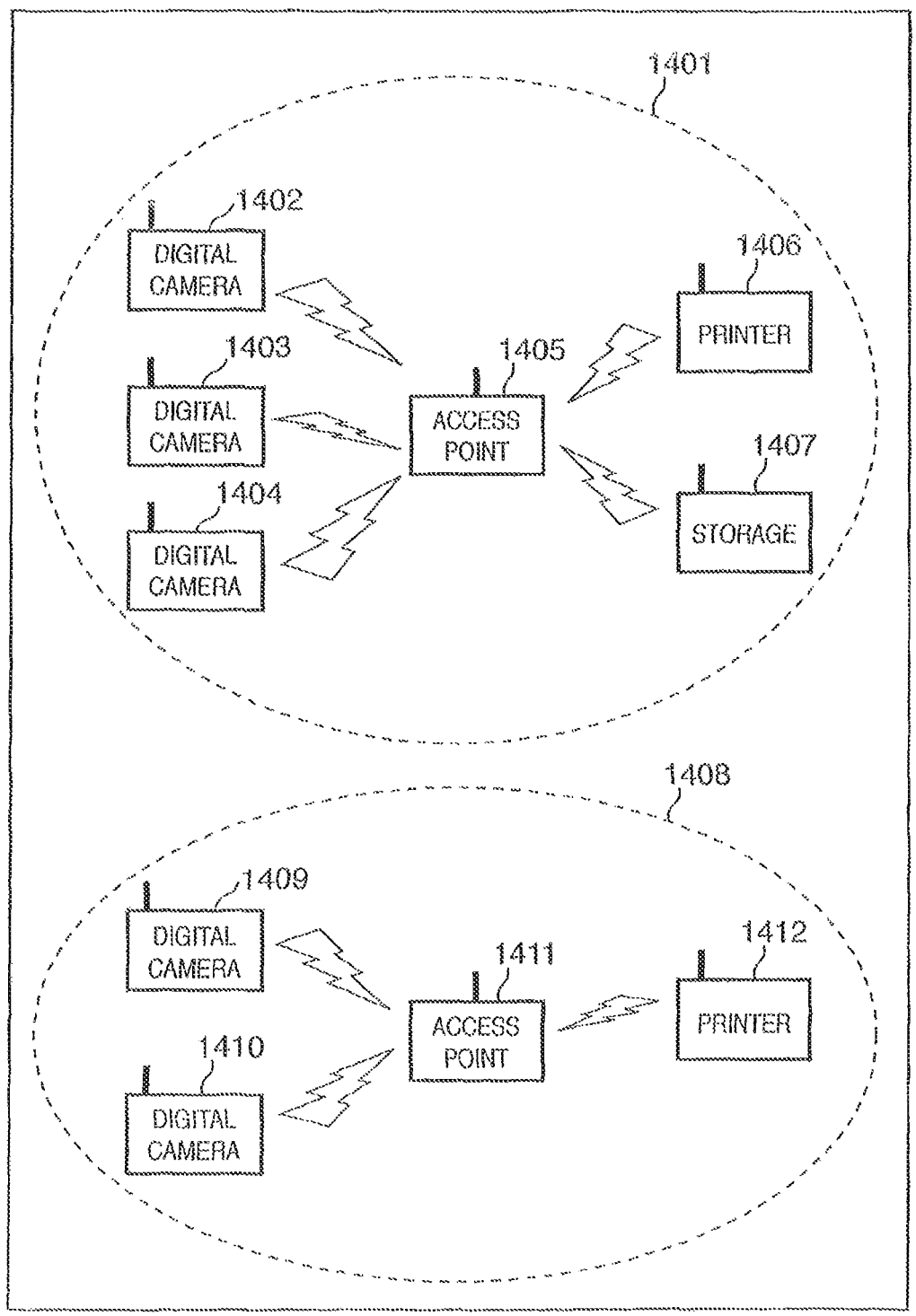
FIG. 14 is a diagram showing another example of the arrangement of a wireless communication system according to the second embodiment of the present invention.

FIG. 14 is a diagram showing another example of the arrangement of a wireless communication system that allows data communications using wireless communication means.

Referring to FIG. 14, digital cameras 1402 to 1404 (their arrangements are the same as that shown in FIG. 3) comprise wireless communication functions, and form a wireless infrastructure network 1401 which allows communications among the digital cameras or with a printer 1406 (see FIG. 4) or storage 1407 (see FIG. 5) via an access point 1405 using the wireless communication means. Likewise, digital cameras 1409 and 1410 form a wireless infrastructure network 1408 with a printer 1412 via an access point 1411.

Figure 15:
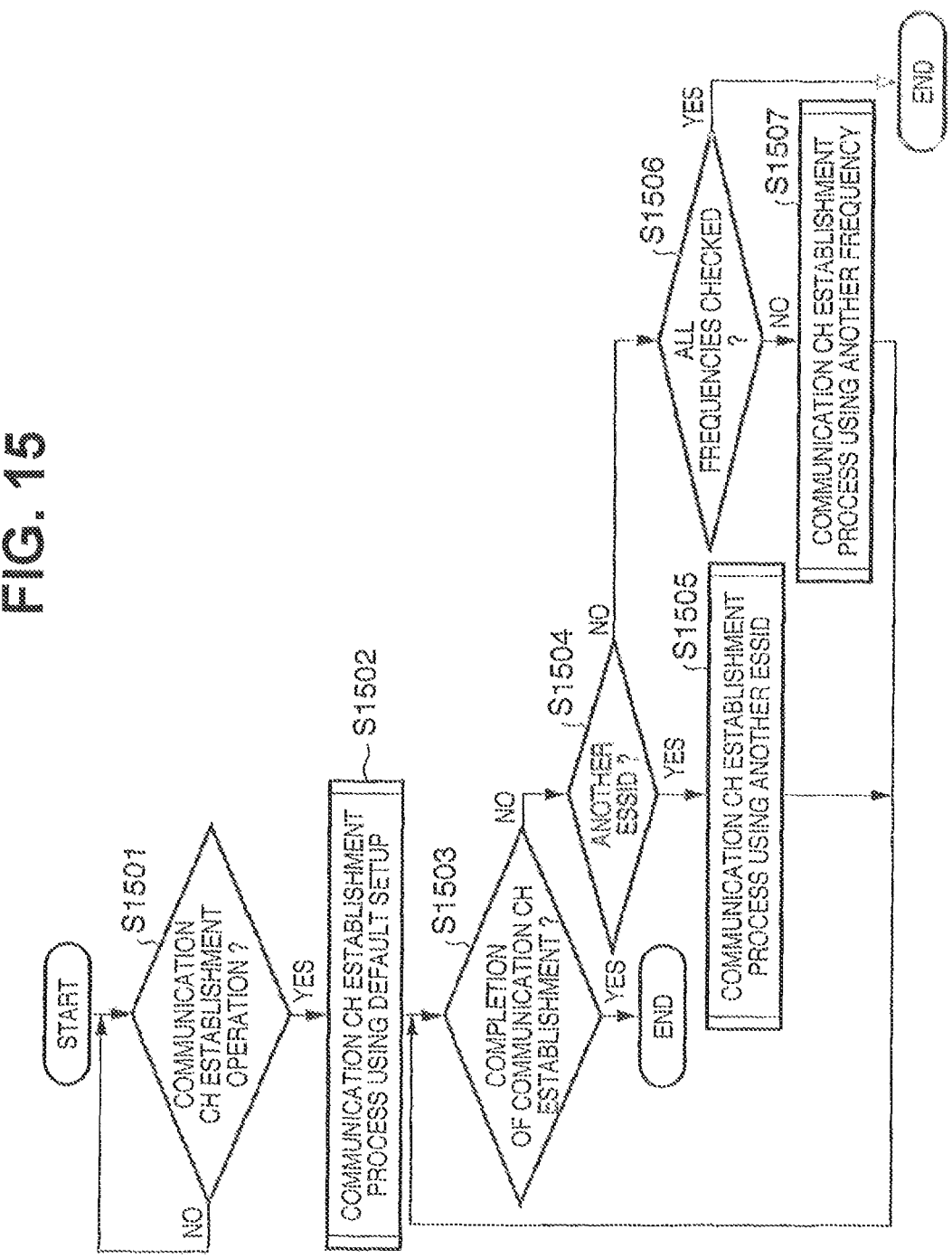
FIG. 15 is a flow chart showing a control process sequence of a wireless communication device according to the second embodiment of the present invention.

FIG. 15 is a flow chart showing another control of the digital camera, printer, or storage in the second embodiment. The processing sequence will be explained taking the digital camera as an example for the sake of simplicity. Assume that a default network setup is set and registered in advance in the flash ROM (see reference numeral 313 in FIG. 3) of the digital camera.

Referring to FIG. 15, upon detection of the operation of an instruction button for a communication channel establishment operation (step S1501), the CPU of the digital camera executes a communication channel establishment process based on the default network setup (step S1502). If communication channel establishment process based on that setup has failed (No in step S1503), the CPU executes a communication channel establishment process (step S1505) using another ESSID present on the identical frequency channel (step S1504). If a communication channel cannot be established even after the process is repeated for all registered ESSIDs, the CPU aborts the search process in the frequency band of interest, and checks if another search frequency is available (step S1506) so as to search another frequency. If another search frequency is available, the CPU sets that frequency and its first ESSID (step S1507) to repeat the processes in step S1503 and subsequent steps.

When the digital camera executes the control shown in FIG. 15, and the printer executes the control shown in FIG. 6, even when the digital camera and printer are present in different wireless communication networks, a communication channel can be established by a simple operation without any setups about the networks.

Figure 16:
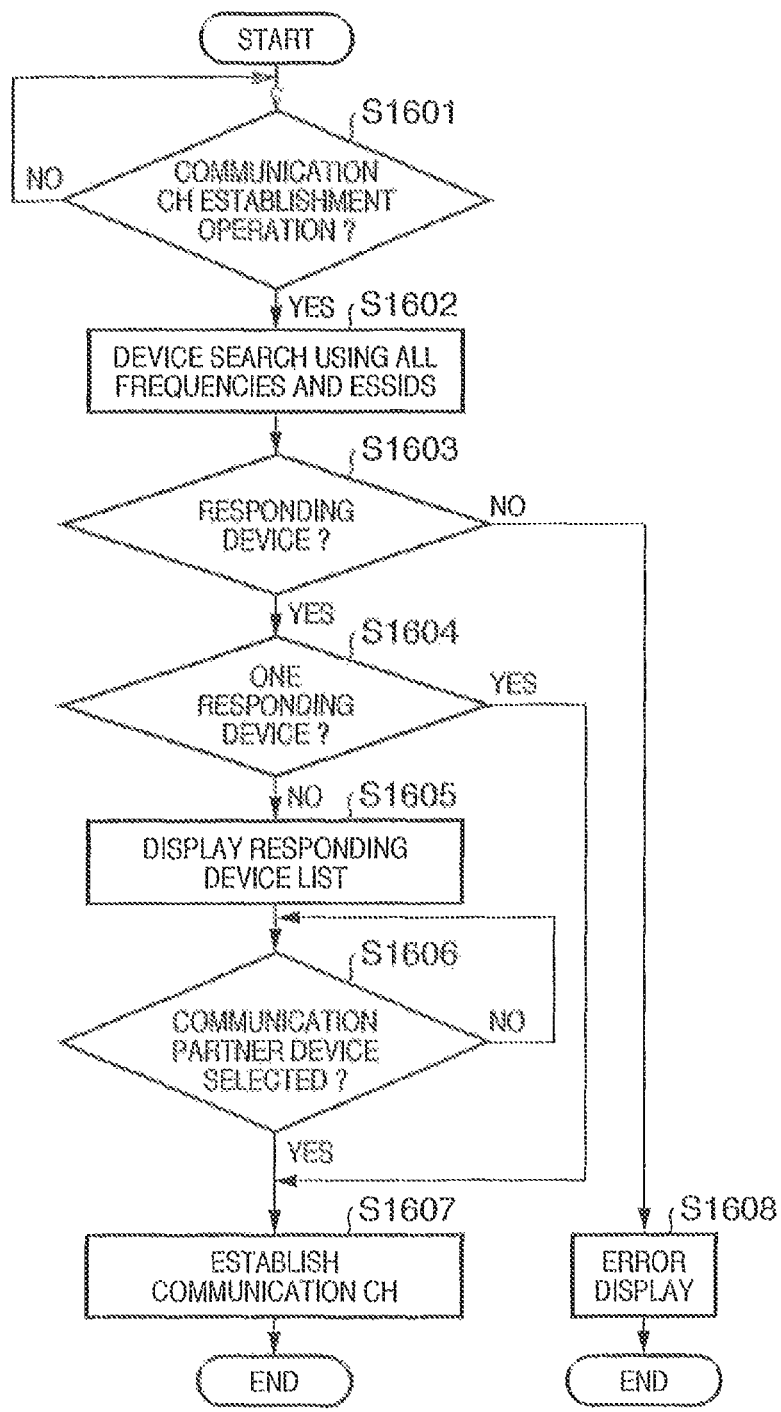
FIG. 16 is a flow chart showing another control process sequence of a wireless communication device according to the second embodiment of the present invention.

FIG. 16 is a flow chart showing another control of the digital camera, printer, or storage in the second embodiment. This flow chart will be explained taking the processes of the digital camera as an example for the sake of simplicity.

Referring to FIG. 16, upon detection of the operation of an instruction button for a communication channel establishment operation in the digital camera (step S1601), a device search process is conducted using all frequency channels (channels 1 to 14 in Japan) and ESSIDs (step S1602). If no device returns a response (step S1603), an error message is displayed, and the flow ends (step S1608). At this time, a message indicating a search failure may be displayed.

If one device returns a response (step S1604), a wireless communication channel with that device is established (step S1607). If a plurality of devices return responses, a list of the devices that respond is displayed (step S1605) to prompt the user to select one communication partner device (step S1606). Then, a wireless communication channel with that device is established. That is, if one device returns a response, connection is established to that device without any user's intervention.

When the digital camera executes the control shown in FIG. 16, and the printer executes the control shown in FIG. 6, even when the digital camera and printer are present in different wireless communication networks, a communication channel can be established by a simple operation without any setups about the networks. When the printer executes the processes shown in FIG. 16, the digital camera can execute the processes shown in FIG. 6.

Third Embodiment

The third embodiment will be described below. The third embodiment will explain an example that facilitates search and selection processes of a partner communication device with which a communication channel is to be established regardless of the communication mode.

Figure 17:
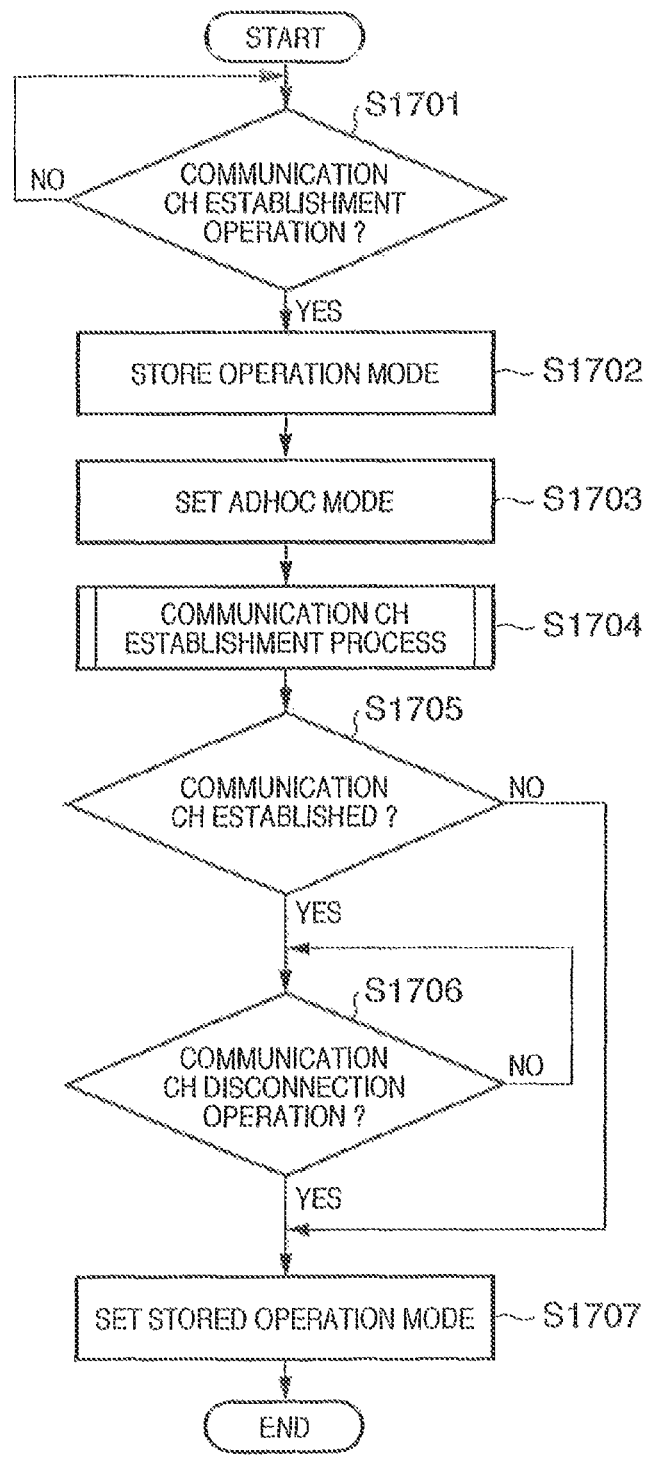
FIG. 17 is a flow chart showing a control process sequence of a wireless communication device according to the third embodiment of the present invention.

FIG. 17 is a flow chart showing another control of the digital camera, printer, or storage in the present invention. In this case as well, the flow chart will be described taking the digital camera as an example for the sake of simplicity.

Referring to FIG. 17, upon detection of the operation of an instruction button for a communication channel establishment operation of the digital camera (step S1701), the current operation mode (adhoc or infrastructure mode) is stored (step S1702), and an adhoc mode is set first (step S1703) to execute a communication channel establishment process (step S1704). The process in step S1704 is executed in the adhoc mode, but the process itself may be one of those shown in FIGS. 6 to 9.

After a communication channel is established (step S1705), an operation is made in the adhoc mode. If the communication channel is disconnected (step S1706), the control returns to the stored operation mode (step S1707). Note that the process for transmitting image data from the digital camera to the printer (or storage) and printing (or saving) that image data is executed while No is determined in step S1706.

When the processes shown in FIG. 17 are executed by the digital camera as the information transmission source and by the printer or storage as the information receiving side, a communication channel between them can be smoothly established.

The reason why the sequence shown in FIG. 17 is adopted will be explained in detail below.

The printer of this embodiment is used in an environment in which its print data generation source is not limited to only the digital camera, and receives and prints data from a personal computer (not limited to one computer). Hence, the printer is normally set in a print data reception waiting state in the infrastructure mode via the access point.

According to the sequence shown in FIG. 17, when the user operates the instruction buttons for a communication channel establishment operation of two devices, i.e., the digital camera and a specific printer, these devices are set in a common communication mode, i.e., the adhoc communication mode to execute a communication establishment process. Hence, a communication channel can be established between these devices, and connection of another device can be excluded.

Figure 18:
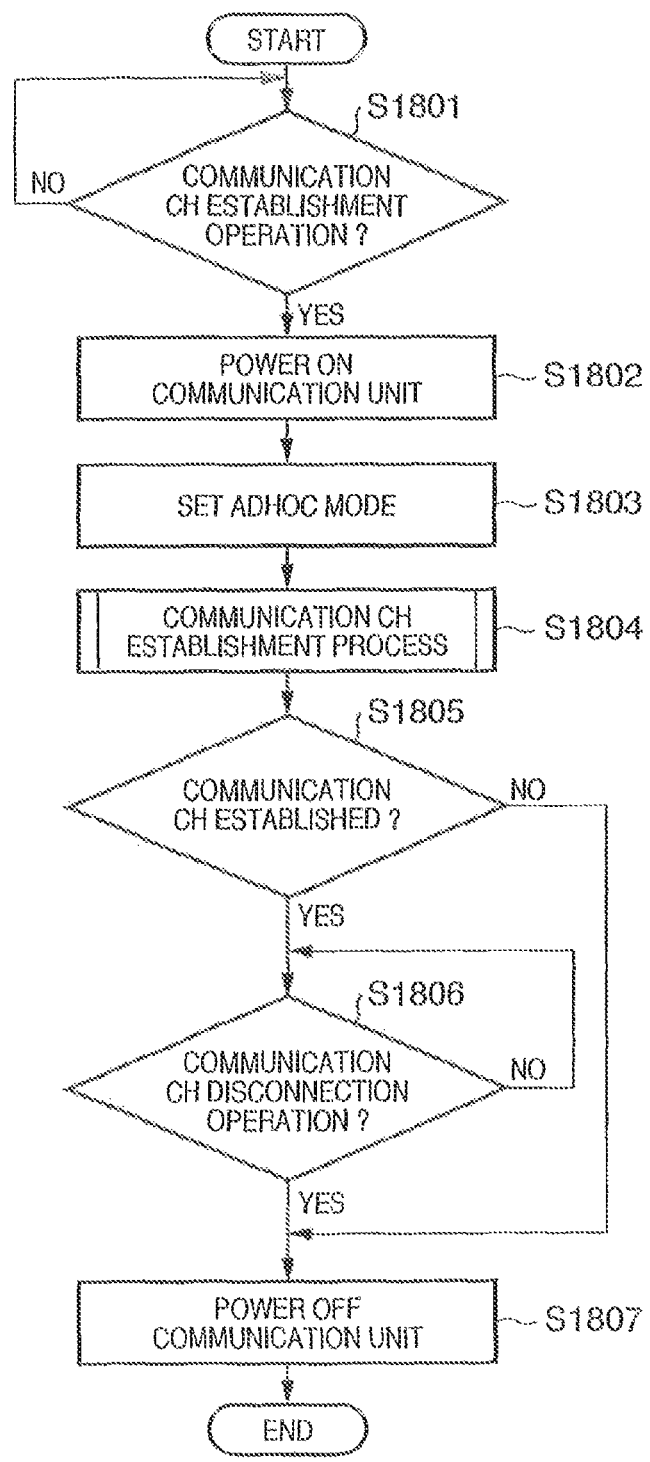
FIG. 18 is a flow chart showing another control process sequence of a wireless communication device according to the third embodiment of the present invention.

FIG. 18 is a flow chart showing another control of the digital camera, printer, or storage in this embodiment. In this case, the following explanation will be given taking the processes of the digital camera as an example for the sake of simplicity.

Referring to FIG. 18, upon detection of the operation of an instruction button for a communication channel establishment operation of the digital camera (step S1801), the power supply of the wireless communication function unit (304 and 305 in FIG. 3) is turned on (step S1802), and an adhoc mode is set (step S1803) to execute a communication channel establishment process (step S1804). After the communication channel is established (step S1805), an operation is made in the adhoc mode. If the communication channel is disconnected (step S1806), the power supply of the communication unit is turned off (step S1807) to attain power savings.

Figure 19:
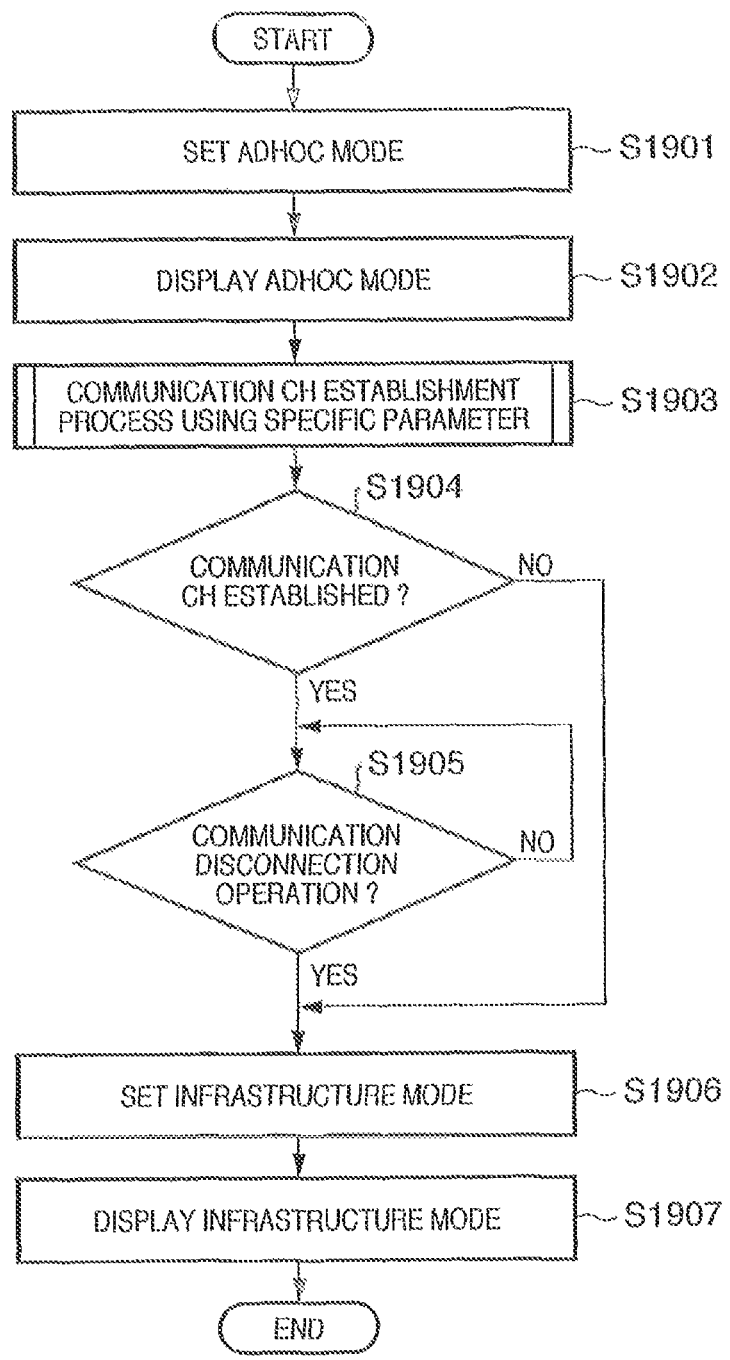
FIG. 19 is a flow chart showing another control process sequence of a wireless communication device on the transmitting side according to the third embodiment of the present invention.
Figure 20:
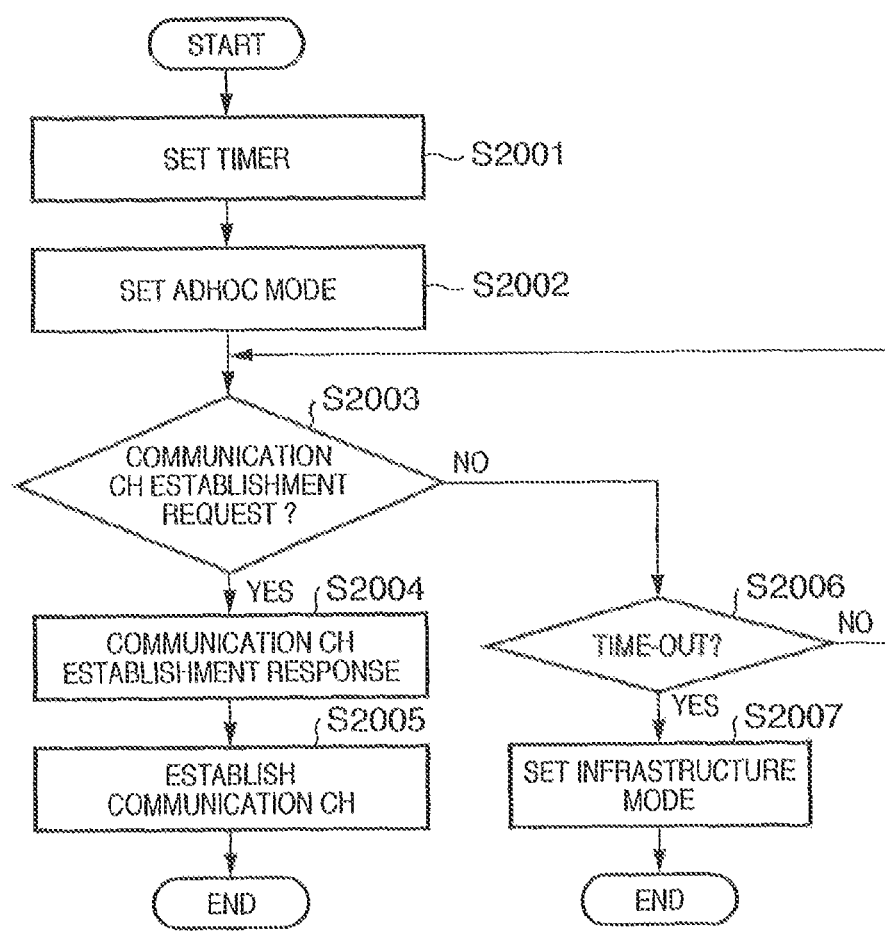
FIG. 20 is a flow chart showing another control process sequence of a wireless communication device on the receiving side according to the third embodiment of the present invention.

FIGS. 19 and 20 are flow charts showing another control of the digital camera, printer, or storage in this embodiment. In the following description, assume that the digital camera (transmitting side) executes the processing sequence shown in FIG. 19, and the printer (receiving side) executes the processing sequence shown in FIG. 20 for the sake of simplicity.

Referring to FIG. 19, if the power supply of the digital camera is turned on and a wireless communication instruction is input or if the power supply is turned on while a wireless communication instruction is input by a switch or button, an adhoc mode is set (step S1901), and a message indicating the adhoc mode is displayed (step S1902). This message may be implemented by various methods such as LCD display, LED indication, and the like. A communication channel establishment process is executed using communication parameters which are set in advance for the adhoc mode or are determined to establish a communication channel (step S1903). After the communication channel is established (step S1904), an operation is made in the adhoc mode. If the communication channel is disconnected (step S1905), an infrastructure mode is set (step S1906) to display a message indicating the infrastructure mode (step S1907).

Referring to FIG. 20, if the power supply of the printer is turned on, a timer is set (step S2001), and an adhoc mode is set. At this time, setup parameters to be used are set in advance or are determined to establish a communication channel. Upon reception of a communication channel establishment request (step S2003), a communication channel establishment response is transmitted (step S2004), thus establishing the communication channel (step S2005). If no communication channel establishment request is received (step S2003), the control waits until the timer reaches a time-out (step S2006). If the timer has reached a time-out, the infrastructure mode is set (Step S2007).

In this manner, when the digital camera executes the control shown in FIG. 19 and the printer executes the control shown in FIG. 20, a communication channel can be easily established by turning on the power supplies of the digital camera and printer.

Figure 21:
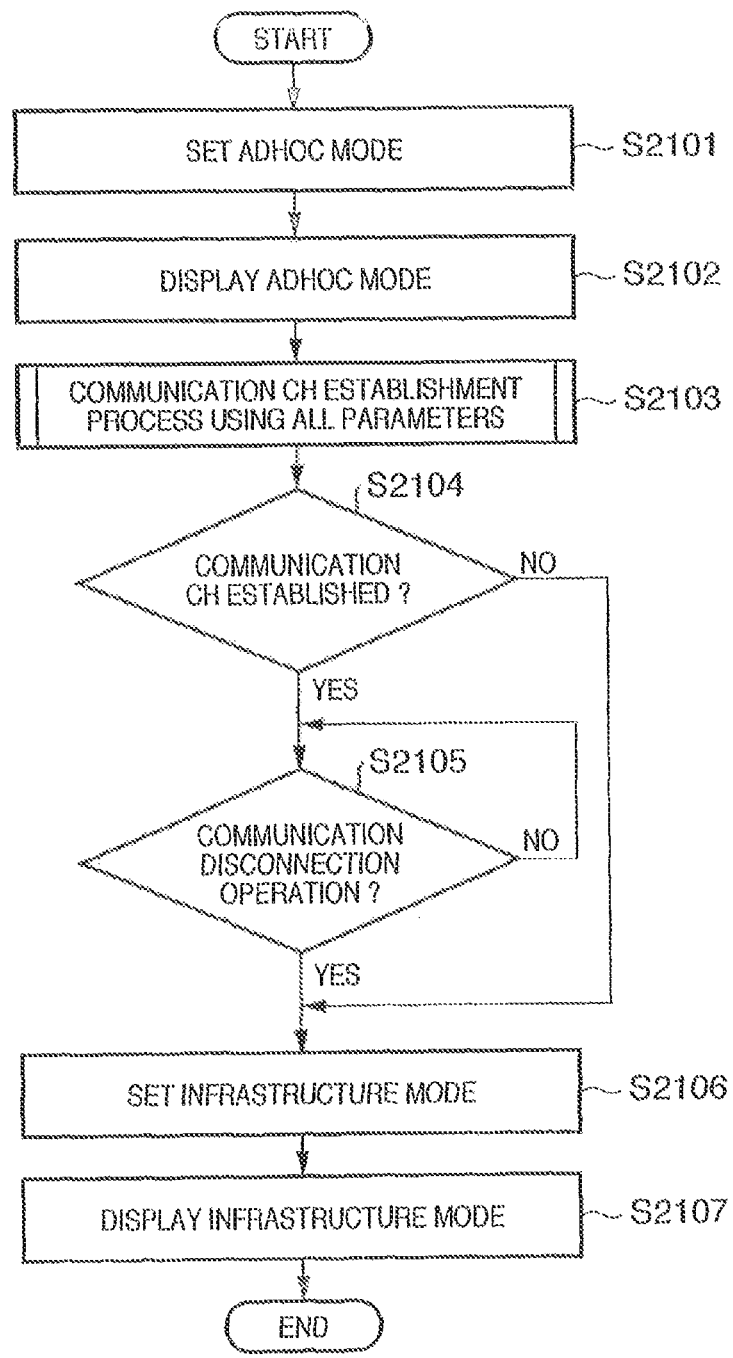
FIG. 21 is a flow chart showing still another control process sequence of a wireless communication device on the transmitting side according to the third embodiment of the present invention.
Figure 22:
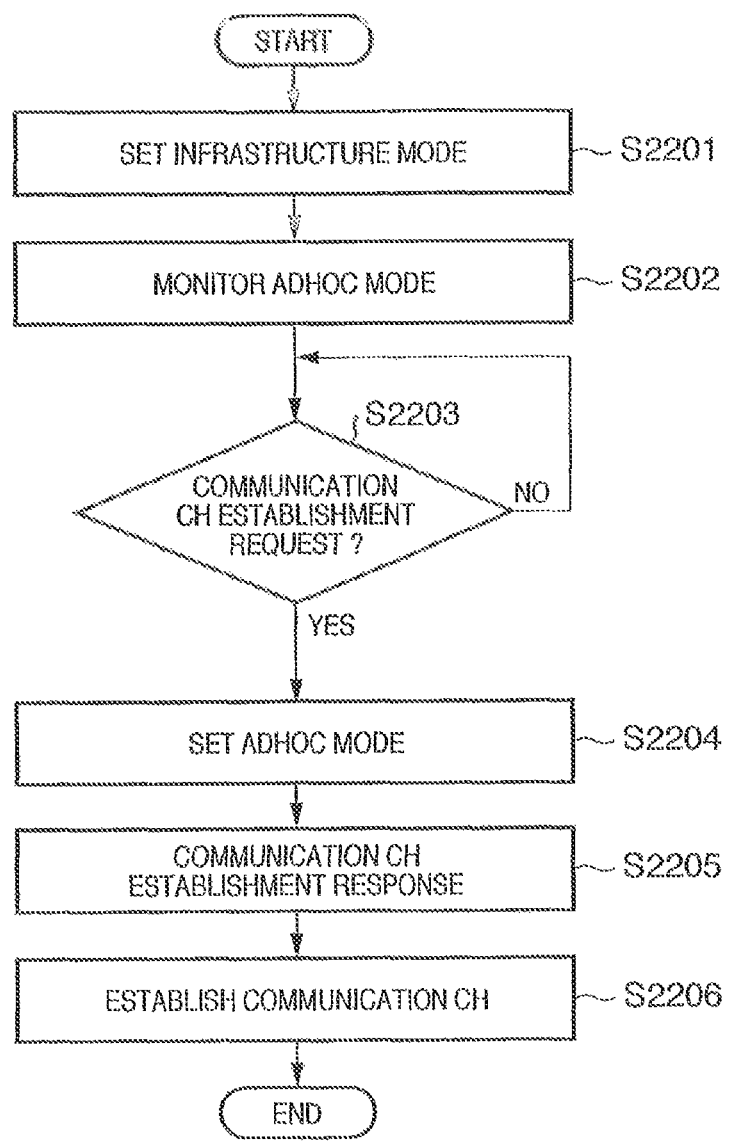
FIG. 22 is a flow chart showing still another control process sequence of a wireless communication device on the receiving side according to the third embodiment of the present invention.

FIGS. 21 and 22 are flow charts showing another control of the digital camera, printer, or storage in this embodiment. In the following description, assume that the digital camera executes the processes shown in FIG. 21, and the printer executes the processes shown in FIG. 22 for the sake of simplicity.

Referring to FIG. 21, if the power supply of the digital camera is turned on or if a wireless communication channel establishment instruction is input, an adhoc mode is set (step S2101), and a message indicating the adhoc mode is displayed (step S2102). This message may be implemented by various methods such as LCD display, LED indication, and the like. A communication channel establishment process is executed using all ESSIDs and all frequency channels in the adhoc mode (step S2103). After the communication channel is established (step S2104), a series of print processes or storage processes (when the storage processes FIG. 22) are executed in the adhoc mode. If the communication channel is disconnected (step S2105), an infrastructure mode is set (step S2106) to display a message indicating the infrastructure mode (step S2107).

Referring to FIG. 22, if the power supply of the printer is turned on or if a reception instruction from the digital camera is input, an adhoc mode is monitored (step S2202) while setting an infrastructure mode (step S2201). At this time, setup parameters to be used in the adhoc mode are set in advance or are determined to establish a communication channel. Also, a beacon of the adhoc mode is output if necessary. Upon reception of a communication channel establishment request in the adhoc mode (step S2203), the adhoc mode is set (step S2204), and a communication channel establishment response is transmitted (step S2205), thus establishing the communication channel (step S2206).

In this manner, when the digital camera executes the control shown in FIG. 21 and the printer executes the control shown in FIG. 22, a communication channel can be easily established by turning on the power supplies of the digital camera and printer or inputting a connection instruction between the digital camera and printer to them.

Fourth Embodiment

The fourth embodiment of the present invention will be described below. The fourth embodiment will describe an example that automatically sets communication parameters for an infrastructure mode, and allows wireless communication devices to easily make wireless communications.

Figure 23:
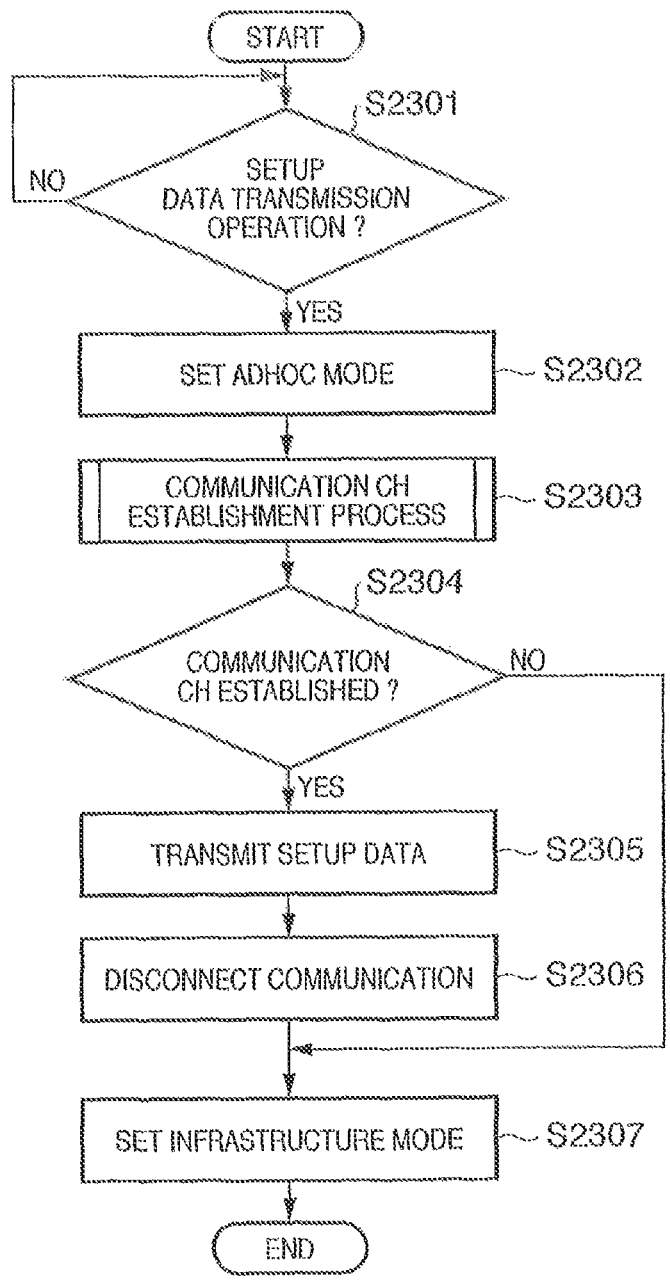
FIG. 23 is a flow chart showing another control process sequence of a wireless communication device on the transmitting side according to the fourth embodiment of the present invention.
Figure 24:
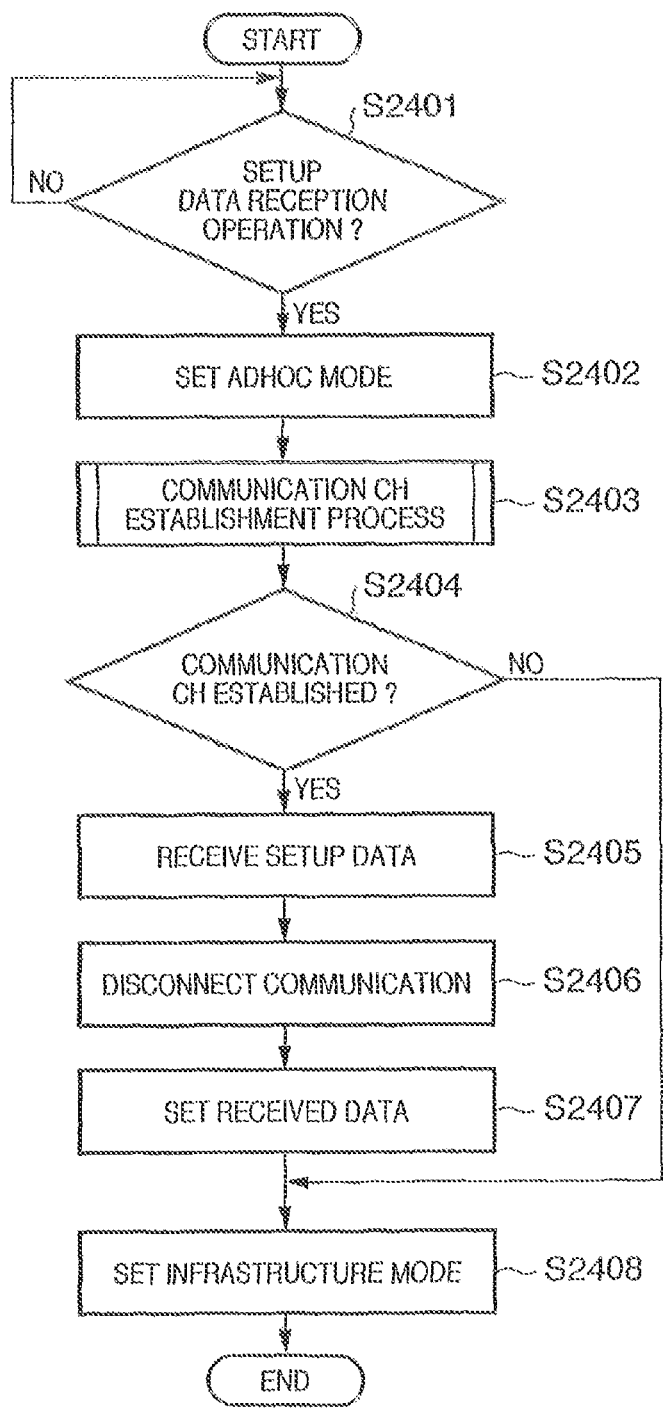
FIG. 24 is a flow chart showing another control process sequence of a wireless communication device on the receiving side according to the fifth embodiment of the present invention.
Figure 25:
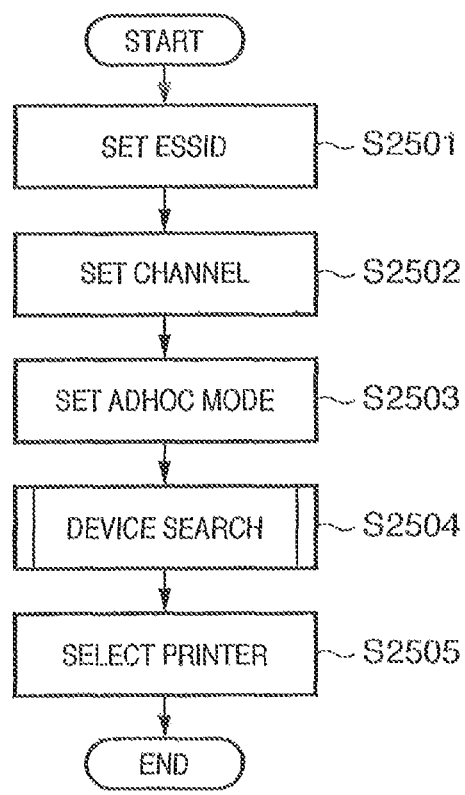
FIG. 25 is a flow chart showing the control of a conventional wireless communication device.

FIGS. 23 and 24 are flow charts showing another control of the digital camera, printer, or storage of the present invention. In the following description, assume that the digital camera executes the processes shown in FIG. 23, and the printer executes the processes shown in FIG. 24 for the sake of simplicity.

Referring to FIG. 23, upon detection of the operation of a setup data transmission button provided to the console (step S2301), the CPU of the digital camera sets an adhoc mode (step S2302) and executes a communication channel establishment process (step S2303). After the communication channel is established (step S2304), the CPU transmits setup data for the infrastructure mode (frequency channel, ESSID, encryption key, and the like) (step S2305), disconnects the communication (step S2306), and sets the infrastructure mode (step S2307).

Referring to FIG. 24, upon detection of the operation of a setup data reception button (step S2401), the CPU of the printer sets the adhoc mode (step S2402), and executes a communication channel establishment process (step S2403). After the communication channel is established (step S2404), the CPU receives the setup data for the infrastructure mode (step S2405), disconnects the communication in the adhoc mode (step S2406), and sets the received setup data as communication parameters of the infrastructure mode (step S2407), thus setting the infrastructure mode (step S2408).

In this manner, when the digital camera executes the control shown in FIG. 23, and the printer executes the control shown in FIG. 24, the digital camera and printer can be easily brought in an identical network in the infrastructure mode.

The first to fourth embodiments have been described. However, the present invention is not limited to these embodiments. For example, the present invention may be applied to a case wherein a specific button, power switch, specific touch panel switch, or the like is used as means for establishing a communication channel. Likewise, embodiments that adopt, as a wireless communication mode of a wireless communication device, the adhoc mode of a wireless LAN, the infrastructure mode of the wireless LAN, a communication mode such as BLUETOOTH, or the like, and adopt, as wireless communication devices, a digital camera, printer, storage, scanner, data input device, data output device, and the like which have a wireless communication function, can be easily implemented.

Combinations of the control processes and devices are not limited to the above embodiments. For example, the control methods of the digital camera and printer may be replaced, or the control method of each of the above embodiments may be implemented as that for another device. As a communication mode, the adhoc and infrastructure modes have been exemplified. However, in terms of control, these two communication modes can be replaced with each other, or communication means other than the wireless LAN such as BLUETOOTH and the like can be defined as communication modes.

As described above, according to the embodiments of the present invention, when a wireless communication channel is to be established upon transmitting an image from the digital camera to the printer (or storage) and making the printer (or storage) print (or save) that image, even if there are a large number of wireless communication devices, a communication is more likely to be established to have a one-to-one relationship, and operations required for the user can be simple.

As described above, according to the present invention, even in an environment that includes a plurality of wireless communication devices, since a one-to-one relationship can be set upon establishing a wireless communication between a wireless communication device on the information transmitting side and a wireless communication device that receives and processes information, simple user's operations can be assured at least until the communication is established.

As many apparently widely different embodiments of the present invention can be made without departing from the spirit and scope thereof, it is to be understood that the invention is not limited to the specific embodiments thereof except as defined in the claims.

The invention claimed is:

1. A wireless communication device comprising:
    one or more processors; and
    one or more memories including instructions that, when executed by the one or more processors, cause the device to:
    determine whether an operator has made a first operation for establishing a communication channel;
    search, using one of a plurality of frequency channels in turn, another wireless communication device at which a second operation for establishing a communication channel has been made;
    establish, in a case where the another wireless communication device at which the second operation has been made is detected within a predetermined time period from when the first operation has been made, a communication channel with the another wireless communication device even if the predetermined time period does not elapse from when the first operation has been made, so that a wireless network between the wireless communication device and the another wireless communication device is formed;
wherein the predetermined time period is a time period that the wireless communication device continues a process for establishing a communication channel in a case where the another wireless communication device at which the second operation for establishing a communication channel has been made is not detected;
receive, from the another wireless communication device on the formed wireless network, a communication parameter including information of an encryption key which is used for a cryptographic communication in an infrastructure mode of a wireless local area network common to the formed wireless network; and
perform processing for the cryptographic communication in the infrastructure mode with the another wireless communication device using the received communication parameter including information of the encryption key.

2. The device according to claim 1, wherein the wireless communication device notifies the operator of an error in a case where the wireless communication device does not detect, within the predetermined time period, the another wireless communication device at which the second operation has been made.

3. The device according to claim 1, wherein the wireless communication device establishes the communication channel with the another wireless communication device without intervention of operation by the operator after it is determined that the first operation has been made.

4. The device according to claim 1, wherein the wireless communication device transmits a request signal for establishing of the communication channel.

5. The device according to claim 4, wherein the wireless communication device transmits the request signal a plurality of times.

6. The device according to claim 4, wherein the wireless communication device receives a response signal corresponding to the request signal.

7. The device according to claim 1, further comprising a timer to measure a time elapsed from when the first operation has been made.

8. The device according to claim 1, wherein the wireless communication device is a digital camera capable of capturing an image.

9. The device according to claim 1, wherein the communication parameter further includes information of SSID (Service Set Identify).

10. The device according to claim 1, wherein the wireless communication device establishes the communication channel with the another wireless communication device even if the another wireless communication device is not set as a default.

11. A method for controlling a wireless communication device, comprising:
determining whether an operator has made a first operation for establishing a communication channel;
searching, using one of a plurality of frequency channels in turn, another wireless communication device at which a second operation for establishing a communication channel has been made;
establishing, in a case where the another wireless communication device at which the second operation has been made is detected within a predetermined time period from when the first operation has been made, a communication channel with the another wireless communication device even if the predetermined time period does not elapse from when the first operation has been made, so that a wireless network between the wireless communication device and the another wireless communication device is formed;
wherein the predetermined time period is a time period that the wireless communication device continues a process for establishing a communication channel in a case where the another wireless communication device at which the second operation for establishing a communication channel has been made is not detected;
receiving, from the another wireless communication device on the formed wireless network, a communication parameter including information of an encryption key which is used for a cryptographic communication in an infrastructure mode of a wireless local area network common to the formed wireless network; and
performing processing for the cryptographic communication in the infrastructure mode with the another wireless communication device using the received communication parameter including information of the encryption key.

12. A non transitory computer readable storage medium storing a program to be loaded to and executed by a computer,
the computer executing the program to execute:
determining whether an operator has made a first operation for establishing a communication channel;
searching, using one of a plurality of frequency channels in turn, another wireless communication device at which a second operation for establishing a communication channel has been made;
establishing, in a case where the another wireless communication device at which the second operation has been made is detected within a predetermined time period from when the first operation has been made, a communication channel with the another wireless communication device if the predetermined time period does not elapse from when the first operation has been made, so that a wireless network between the wireless communication device and the another wireless communication device is formed;
wherein the predetermined time period is a time period that the wireless communication device continues a process for establishing a communication channel in a case where the another wireless communication device at which the second operation for establishing a communication channel has been made is not detected;
receiving, from the another wireless communication device on the formed wireless network, a communication parameter including information of an encryption key which is used for a cryptographic communication in an infrastructure mode of a wireless local area network common to the formed wireless network; and
performing processing for the cryptographic communication in the infrastructure mode with the another wireless communication device using the received communication parameter including information of the encryption key.

13. The device according to claim 1, wherein the formed wireless network, by establishing the communication channel between the wireless communication device and the another wireless communication device, is a wireless network in an adhoc mode.

14. The device according to claim 1, wherein the formed wireless network, by establishing the communication channel between the wireless communication device and the another wireless communication device, is different from a wireless network in an infrastructure mode.

15. The device according to claim 1, wherein the wireless communication device disconnects the formed wireless network according to receiving the communication parameter from the another wireless communication device.

16. The device according to claim 15, wherein the wireless communication device transits from the formed wireless network to the wireless local area network of the cryptographic communication when the wireless communication device disconnects the formed wireless network.

* * * * *